United States Patent
Iwasawa et al.

(10) Patent No.: US 12,040,995 B2
(45) Date of Patent: Jul. 16, 2024

(54) CONTROL APPARATUS, RESOURCE ALLOCATION METHOD AND PROGRAM

(71) Applicant: NIPPON TELEGRAPH AND TELEPHONE CORPORATION, Tokyo (JP)

(72) Inventors: Hiroki Iwasawa, Tokyo (JP); Nobuhiro Azuma, Tokyo (JP); Takahide Kitsu, Tokyo (JP); Hitoshi Masutani, Tokyo (JP); Takeshi Kuwahara, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/253,671

(22) PCT Filed: Nov. 25, 2020

(86) PCT No.: PCT/JP2020/043869
§ 371 (c)(1),
(2) Date: May 19, 2023

(87) PCT Pub. No.: WO2022/113216
PCT Pub. Date: Jun. 2, 2022

(65) Prior Publication Data
US 2023/0412522 A1    Dec. 21, 2023

(51) Int. Cl.
*G06F 15/173* (2006.01)
*H04L 47/70* (2022.01)

(52) U.S. Cl.
CPC ................. *H04L 47/826* (2013.01)

(58) Field of Classification Search
CPC .................................................. H04L 47/826
(Continued)

(56) References Cited

U.S. PATENT DOCUMENTS

| 6,982,969 B1 * | 1/2006 | Carneal | H04W 84/08 370/480 |
| 2007/0041401 A1 * | 2/2007 | Kaneda | H04L 47/70 370/468 |

(Continued)

FOREIGN PATENT DOCUMENTS

| EP | 1755291 A2 * | 2/2007 | ............. H04L 47/14 |
| JP | 2017-034633 | 2/2017 | |

(Continued)

OTHER PUBLICATIONS

LAN/MAN Standards Committee of the IEEE Computer Society, "IEEE Standard for Local and metropolitan area networks—Bridges and Bridged Networks, Amendment 25: Enhancements for Scheduled Traffic", IEEE Std 802.1Qbv™—2015, Mar. 18, 2016.

(Continued)

*Primary Examiner* — Liang Che A Wang
(74) *Attorney, Agent, or Firm* — IPUSA, PLLC

(57) ABSTRACT

A control device that performs resource allocation to a network including a transmission device, one or more transfer devices, and a reception device as nodes, the control device including a schedule database unit that holds schedules of time slots not allocated to specific communication, the schedules being set in advance for respective nodes of the network, and a schedule processing unit that, in a case where a communication request is received, selects a time slot that satisfies a transmission request amount of the transmission device on the basis of remaining transmittable amounts of respective time slots in the schedules and notifies the transmission device of a selected time slot.

7 Claims, 37 Drawing Sheets

(58) Field of Classification Search
USPC .................................... 709/223, 225, 226
See application file for complete search history.

(56) References Cited

U.S. PATENT DOCUMENTS

| | | | |
|---|---|---|---|
| 2011/0292949 A1* | 12/2011 | Hayashi | H04L 45/00 370/419 |
| 2013/0016759 A1* | 1/2013 | Hui | H04B 1/713 375/135 |
| 2017/0079033 A1* | 3/2017 | Lin | H04W 72/52 |
| 2023/0412522 A1* | 12/2023 | Iwasawa | H04L 47/826 |

FOREIGN PATENT DOCUMENTS

| | | |
|---|---|---|
| JP | 2017034633 A * | 2/2017 |
| WO | 2009/025329 | 2/2009 |

OTHER PUBLICATIONS

LAN/MAN Standards Committee of the IEEE Computer Society, IEEE Standard for Local and Metropolitan Area Networks—Bridges and Bridged Networks, Amendment 31: Stream Reservation Protocol (SRP) Enhancements and Performance Improvements, IEEE Std 802.1Qcc™—2018, Oct. 31, 2018.

Naresh Ganesh Nayak et al., "Time-sensitive Software-defined Network (TSSDN) for Real-time Applications", RTNS '16, Oct. 19, 2016.

Naresh Ganesh Nayak et al., "Incremental Flow Scheduling and Routing in Time-Sensitive Software-Defined Networks", IEEE Transactions on Industrial Informatics, vol. 14, No. 5, 2018, pp. 2066-2075.

Jinli Yan et al., "Injection Time Planning: Making CQF Practical in Time-Sensitive Networking", Proceedings of the IEEE International Conference on Computer Communications (IEEE Infocom 2020), Jul. 6, 2020, pp. 616-625.

* cited by examiner

Fig. 5

| 16 BITS | 3 BITS | 1 BIT | 12 BITS |
|---|---|---|---|
| TPID | TCI | | |
| | PCP | CFI | VID |

Fig. 13

| GATE OPENING CLASS | 0 | 1 | 3 | 3 | 4 | 0 | 7 | 0 | 1 |
|---|---|---|---|---|---|---|---|---|---|
| Talker | – | 500 | 200 | 100 | 200 | – | 1200 | – | 800 |
| TSN Switch 1 | – | 1000 | 1300 | 200 | 500 | – | 1200 | – | 1700 |
| TSN Switch 2 | – | 1200 | 1500 | 500 | 2000 | – | 1800 | – | 200 |
| min (VIA NODES) | – | 500 | 200 | 100 | 200 | – | 1200 | – | 200 |

A

CASE WHERE TRANSMISSION REQUEST AMOUNT IS 1000

| GATE OPENING CLASS | 0 | 1 | 3 | 3 | 4 | 0 | 7 | 0 | 1 |
|---|---|---|---|---|---|---|---|---|---|
| Talker | – | 500 | 200 | 100 | 200 | – | 1200 | – | 800 |
| TSN Switch 1 | – | 1000 | 1300 | 200 | 500 | – | 1200 | – | 1700 |
| TSN Switch 2 | – | 1200 | 1500 | 500 | 2000 | – | 1800 | – | 200 |
| min (VIA NODES) | – | 500 | 200 | 100 | 200 | – | 1200 | – | 200 |

| 0 | 1 | 3 | 3 | 4 | 0 | 7 | 0 | 1 |
|---|---|---|---|---|---|---|---|---|
| – | 500 | 200 | 100 | 200 | – | 200 | – | 800 |
| – | 1000 | 1300 | 200 | 500 | – | 200 | – | 1700 |
| – | 1200 | 1500 | 500 | 2000 | – | 800 | – | 200 |

Fig. 20

| Talker | 2 | 0 | 1 | 0 | 2 | 0 | 1 | 0 | 2 |
|---|---|---|---|---|---|---|---|---|---|
| TSN Switch 1 | 1 | 0 | 2 | 0 | 1 | 0 | 2 | 0 | 1 |
| TSN Switch 2 | 2 | 0 | 1 | 0 | 2 | 0 | 1 | 0 | 2 |

Fig. 21

| Talker | 2 | 0 | 1 | 0 | 2 | 0 | 1 | 0 | 2 |
|---|---|---|---|---|---|---|---|---|---|
| TSN Switch 1 | 1 | 0 | 2 | 0 | 1 | 0 | 2 | 0 | 1 |
| TSN Switch 2 | 2 | 0 | 1 | 0 | 2 | 0 | 1 | 0 | 2 |

Fig. 24

| GATE OPENING CLASS | 0 | 1 | 3 | 3 | 4 | 7 | 0 | 1 | 3 | 3 | 4 | 7 |
|---|---|---|---|---|---|---|---|---|---|---|---|---|
| Talker | - | 500 | 200 | 100 | 200 | 1200 | - | 500 | 200 | 100 | 200 | 1200 |
| TSN Switch 1 | - | 1000 | 1300 | 200 | 500 | 1200 | - | 1000 | 1300 | 200 | 500 | 1200 |
| TSN Switch 2 | - | 1200 | 1500 | 500 | 2000 | 1800 | - | 1200 | 1500 | 500 | 2000 | 1800 |
| min (VIA NODES) | - | 500 | 200 | 100 | 200 | 1200 | - | 500 | 200 | 100 | 200 | 1200 |

EXAMPLE OF MANAGEMENT DATA IN TIME SLOT DB OF DEVICE X, TRANSMISSION PORT Y

DEVICE X, TRANSMISSION PORT Y, TIME SLOT ID1

DEVICE X, TRANSMISSION PORT Y, TIME SLOT ID2

DEVICE X, TRANSMISSION PORT Y, TIME SLOT ID3

| RESOURCE RESERVATION ID | TRANSMISSION ALLOCATION AMOUNT | TOTAL COMMUNICATION ALLOCATION AMOUNT | PRIORITY LEVEL |
|---|---|---|---|
| 2435 | 400 | 4000 | 3 |
| 5353 | 200 | 1000 | 3 |
| 2323 | 10 | 2000 | 2 |
| ... | ... | ... | ... |

CONTROL APPARATUS, RESOURCE ALLOCATION METHOD AND PROGRAM

TECHNICAL FIELD

The present invention relates to technology of allocating resources for packet communication on a network.

BACKGROUND ART

Time sensitive networking (TSN) that can coexist with best effort communication while guaranteeing delay and jitter on industrial automotive Ethernet (registered trademark) has attracted attention in recent years.

In the future, by using the TSN, a fixed time communication service not only in a LAN closed in a factory or in an automobile but also in a wide area such as closed loop control between remote factories is expected to be implemented.

CITATION LIST

Non Patent Literature

Non Patent Literature 1: IEEE802.1Qbv Time Aware Shaper
Non Patent Literature 2: IEEE802.1Qcc Stream reservation enhancements
Non Patent Literature 3: Naresh Ganesh Nayak et al., "Time-sensitive Software-defined Network (TSSDN) for Real-time Applications," RTNS'16, 2016.

SUMMARY OF INVENTION

Technical Problem

However, in the conventional art, there are following issues in using existing TSN not in a factory and an automotive LAN but in a wide area network such as a data center connected to a larger number of terminals and applications using the TSN.

That is, since only eight classes of Gate opening and closing are defined in the existing standard, there is an issue that nine or more types of schedules (setting of transmission timing) cannot be performed.

Furthermore, in the existing standard, since settings of all devices need to be performed using NETCONF, OpenFlow, or the like, there is an issue that an increase in control traffic, an increase in time until the settings are completed, communication interruption of TSN communication due to setting change (addition and deletion of a service), and the like occur. That is, there is an issue that communication settings based on schedules are inefficient.

The present invention has been made in view of the above points, and an object of the present invention is to provide technology that enables scheduling that is not limited to nine types in scheduling resources for a communication request, and enables efficient setting of communication resources.

Solution to Problem

According to the disclosed technology, there is provided a control device that performs resource allocation to a network including a transmission device, one or more transfer devices, and a reception device as nodes, the control device including a schedule database unit that holds schedules of time slots not allocated to specific communication, the schedules being set in advance for respective nodes of the network, and a schedule processing unit that, in a case where a communication request is received, selects a time slot that satisfies a transmission request amount of the transmission device on the basis of remaining transmittable amounts of respective time slots in the schedules and notifies the transmission device of a selected time slot.

Advantageous Effects of Invention

According to the disclosed technology, there is provided technology that enables scheduling that is not limited to nine types in scheduling resources for a communication request, and enables efficient setting of communication resources.

BRIEF DESCRIPTION OF DRAWINGS

FIG. 5 is a diagram illustrating a configuration of a VLAN tag.
FIG. 13 is a diagram for describing Example 1.
FIG. 20 is a diagram for describing Example 2.
FIG. 21 is a diagram for describing Example 2.
FIG. 24 is a diagram for describing Example 3.
FIG. 29 is a diagram for describing Example 6.

DESCRIPTION OF EMBODIMENTS

Hereinafter, an embodiment of the present invention (present embodiment) will be described with reference to the drawings. The embodiment described below is merely an example, and embodiments to which the present invention is applied are not limited to the following embodiment.

In the present embodiment, scheduling technology of resources for packet communication for communication devices supporting TSN will be described. Prior to describing the technology according to the present embodiment, first, conventional technology related to scheduling of the present embodiment and issues thereof will be described. Note that "frame" may be used in the same meaning as "packet".

Conventional Art

Figure 1:
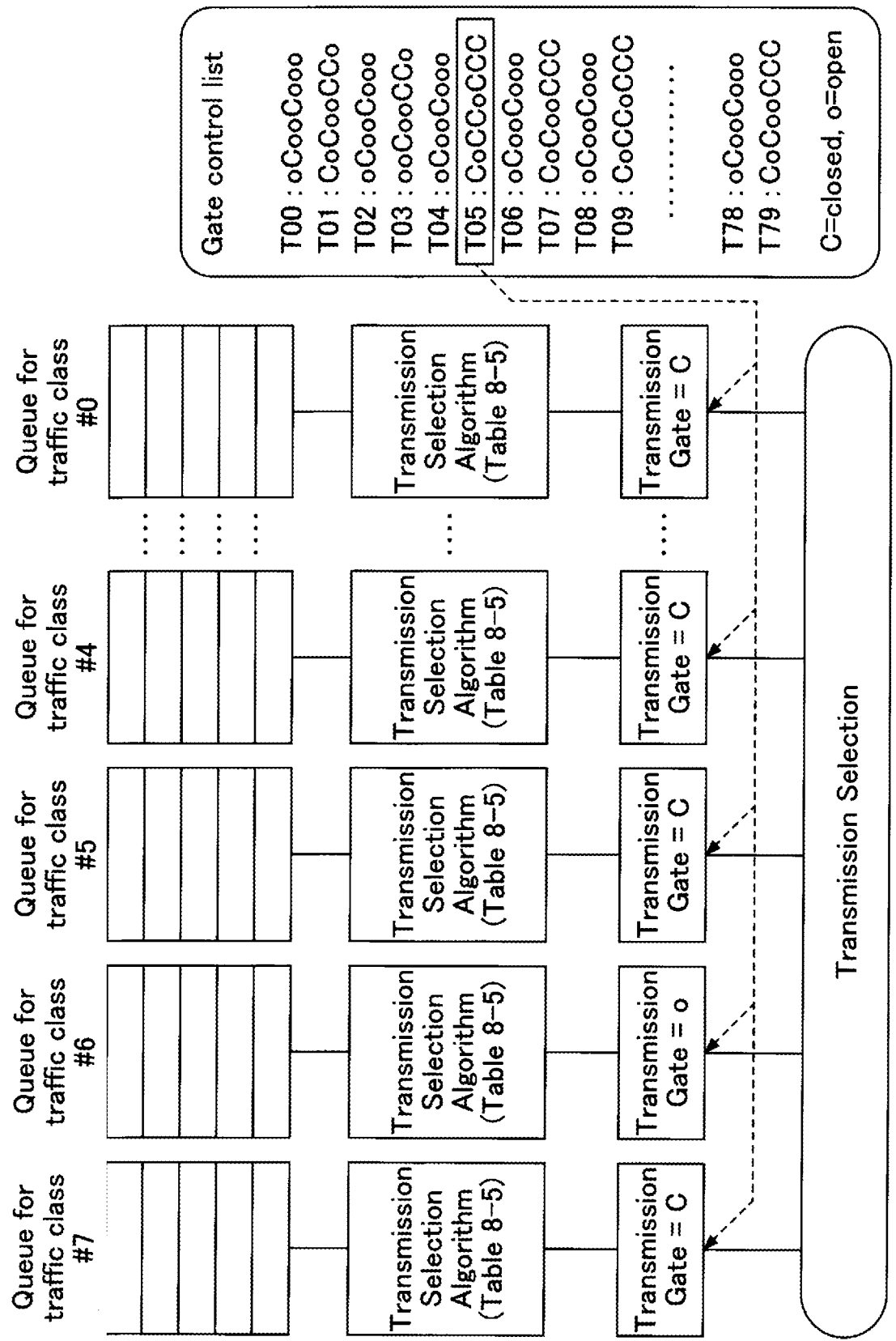
FIG. 1 is a diagram illustrating an IEEE802.1Qbv Time Aware Shaper.

In an IEEE802.1Qbv Time Aware Shaper disclosed in Non Patent Literature 1, as illustrated in FIG. 1, a maximum of eight classes of transmission queues are prepared for each port of communication devices, and gate opening and closing for controlling whether transmission is enabled is controlled depending on time based on an internal clock. However, nine or more types of scheduling cannot be performed in terms of specifications. In the IEEE802.1Qbv Time Aware Shaper, settings are independent for each port of devices.

Figure 2:
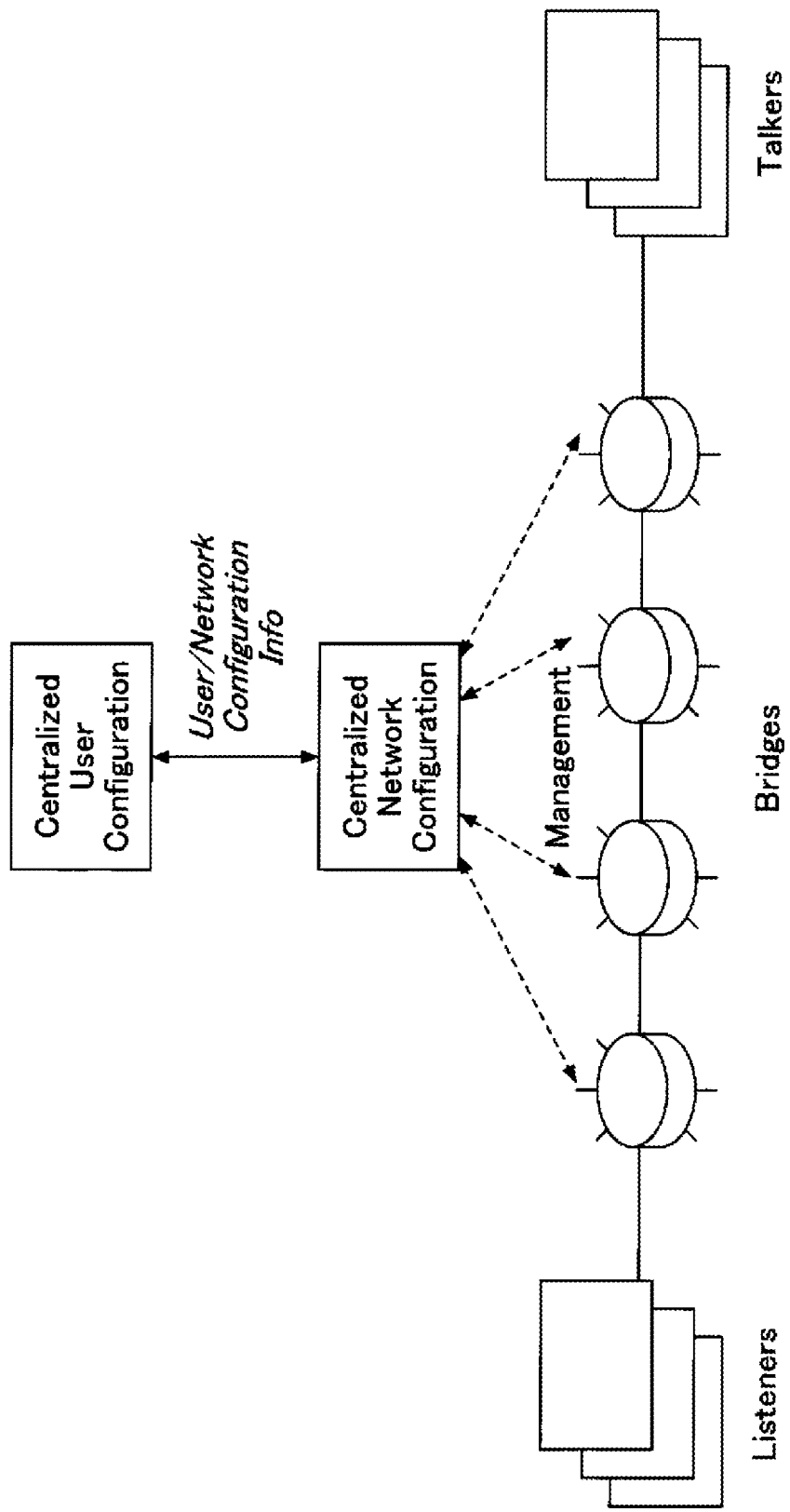
FIG. 2 is a diagram illustrating IEEE 802.1Qcc Stream reservation enhancements.

As illustrated in FIG. 2, IEEE802.1Qcc Stream reservation enhancements disclosed in Non Patent Literature 2 defines a method in which a schedule is set for an entire TSN domain using a centralized network configuration (CNC) for changing settings of respective TSN compatible devices using SNMP, NETCONF, RESTCONF, or the like, and a centralized user configuration (CUC) in which a user reflects a setting policy in the CNC. In this method, in a case where there is a change in the schedule, the settings of all the devices basically need to be changed.

In technology disclosed in Non Patent Literature 3, a controller calculates a route and a schedule on the basis of a transmission request from a Talker (transmission device), and reflects a routing table and scheduling on each network device using OpenFlow. Furthermore, the route and the scheduling of time slots are calculated as an integer programming problem.

Although this method has an advantage that dynamic scheduling and route setting can be performed for each flow request, the settings of all the corresponding network devices need to be changed similarly to the 802.1Qcc. Furthermore, class of service (CoS) values are used for class classification, and there is no compatibility with nine or more classes.

Issues

TSN is expected to be used not only in a factory and an automotive LAN but also in a wide area network such as a data center connected to a larger number of terminals and applications using the TSN. However, in a case where existing TSN is used in a wide area network, the following issues occur.

In existing Qbv disclosed in Non Patent Literature 1, only eight classes of VLAN priority code point (PCP) defined by IEEE802.1Q are specified for gate opening and closing, and nine or more types of schedules (setting of transmission timing) cannot be performed in the same link. Here, although separating queues for each VLAN ID and transmission and reception MAC/IP address is theoretically possible, an enormous number of queues needs to be prepared for each port of devices. An enormous number of queues also needs to be allocated in terms of scheduling. Furthermore, the standard specification of TSN needs to be modified.

In technology disclosed in Non Patent Literatures 2 and 3, settings of all devices need to be changed using NETCONF, OpenFlow, or the like, and an increase in control traffic, an increase in time until the settings are completed, and communication interruption of scheduled TSN communication occur.

Hereinafter, technology according to the present embodiment for solving the above issues will be described.

Outline of Present Embodiment

Figure 3:
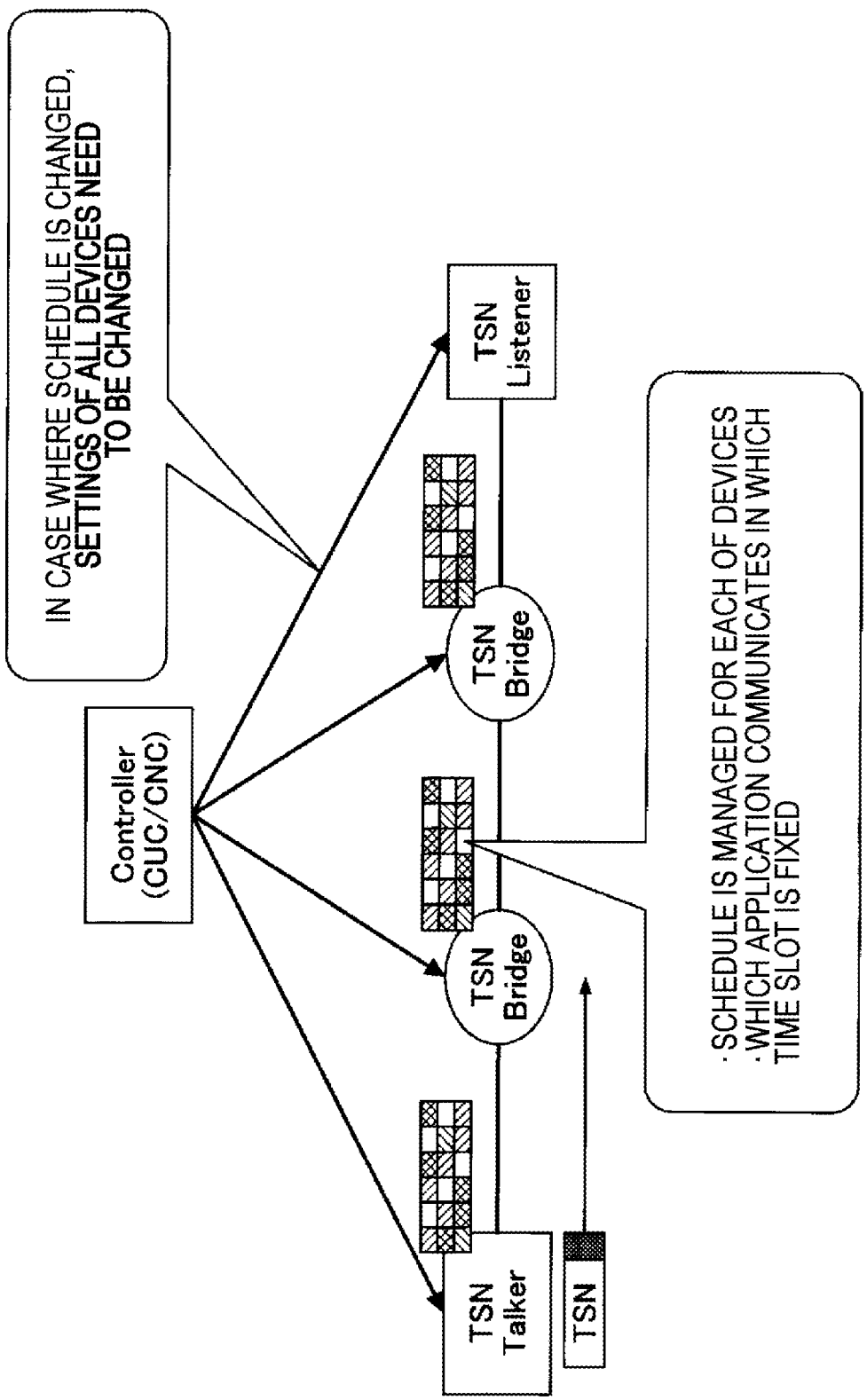
FIG. 3 is a diagram illustrating a conventional TSN.
Figure 4:
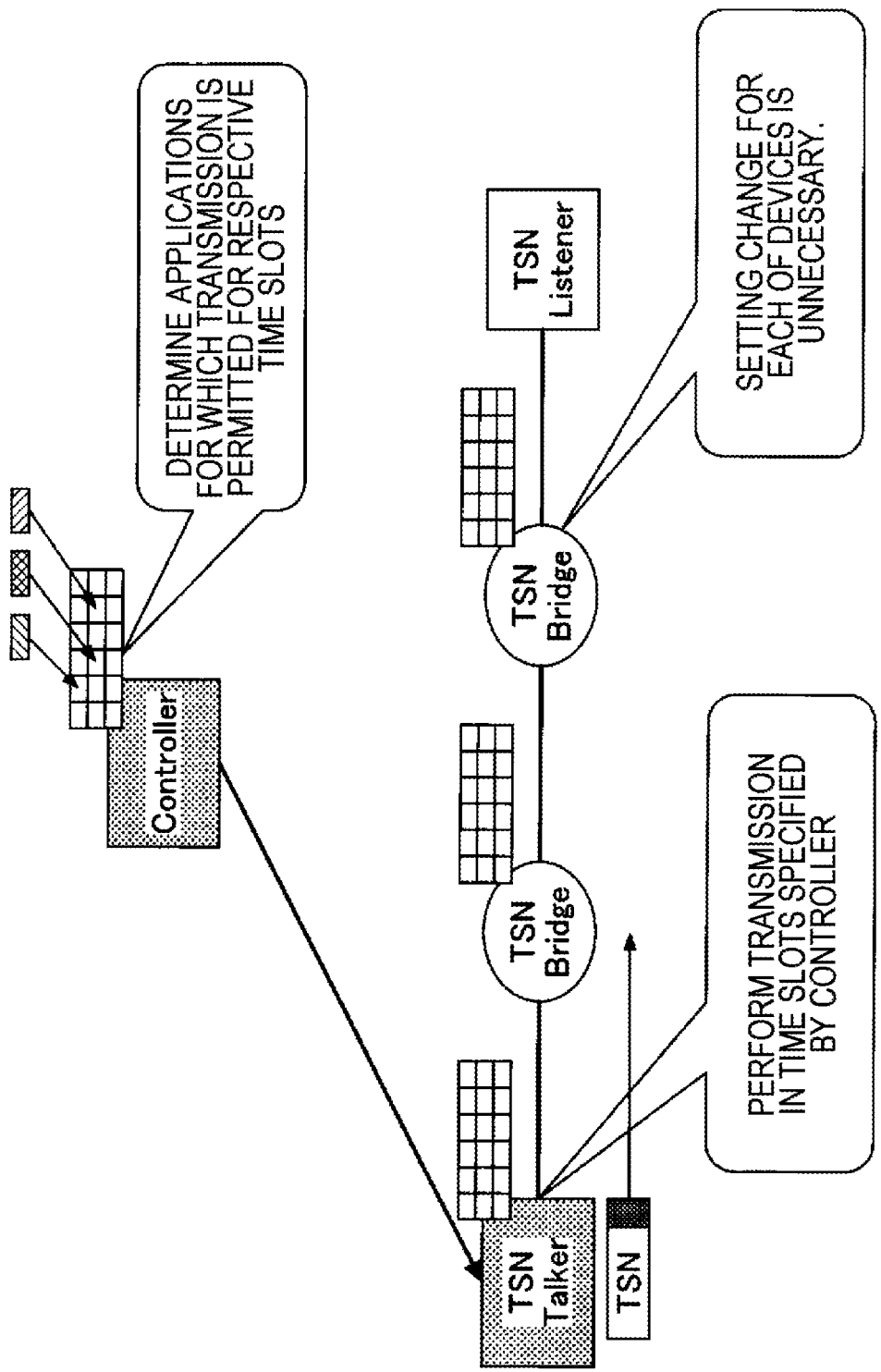
FIG. 4 is a diagram illustrating an outline of a method of the present embodiment.

First, an outline of technology according to the present embodiment will be described. FIG. 3 illustrates an existing TSN network for comparison, and FIG. 4 illustrates a TSN network using the technology according to the present embodiment.

As illustrated in FIG. 3, in the existing TSN network, in a case where a schedule is changed, settings of all devices constituting the network need to be changed. Furthermore, a schedule is managed for each of the devices, and which application communicates in which time slot is fixed for each of the devices.

On the other hand, in the TSN network in the present embodiment, a schedule of IEEE802.1 Qbv divided into time slots of fixed time is set in advance for non-priority communication and priority communication in all the devices constituting the network (each of the devices). At the time of the schedule setting, what is transmitted in which slot is not determined.

Thereafter, a Controller that manages the transmission amounts of all the devices allocates the priority communication to time slots. That is, as illustrated in FIG. 4, the Controller determines applications for which transmission is permitted for respective time slots, and notifies a transmission device (Talker) of the applications. The Talker performs transmission in the time slots specified by the Controller.

Such technology enables elimination of setting work for each of the devices that is required every time settings are changed in the conventional art, and efficient setting of a TSN service. As a result, high-speed addition and deletion of a TSN service can be implemented.

Terms

Next, main terms used in the present embodiment will be described.

Class of Service (CoS) Value

A CoS value is a value in a PCP area prepared in 3 bits in a VLAN tag illustrated in FIG. 5 and represents 0 to 7 priority classes for quality of service (QoS). A CoS value is used for classification of TSN classes, lossless control used in RDMA over converged ethernet (registered trademark) (RoCE), and the like.

TSN Domain

A TSN domain is a network in which devices that support at least two of time synchronization such as IEEE802.1AS and ASrev and opening and closing of gates of IEEE802.1Qbv are connected.

One-Time Communication

One-time communication is communication that occurs only once, and is communication of one or more packets having close transmission intervals, or frame groups. One-time communication is also referred to as Flowlet. Examples of one-time communication include an http request and response, a DNS request, and the like.

Periodic Communication

Periodic communication is communication that repeatedly occurs every certain time period. Periodic communication is also referred to as isochronous transfer. Examples of periodic communication include precision time protocol (PTP), audio and video traffic, and the like.

(System Configuration)

Figure 6:
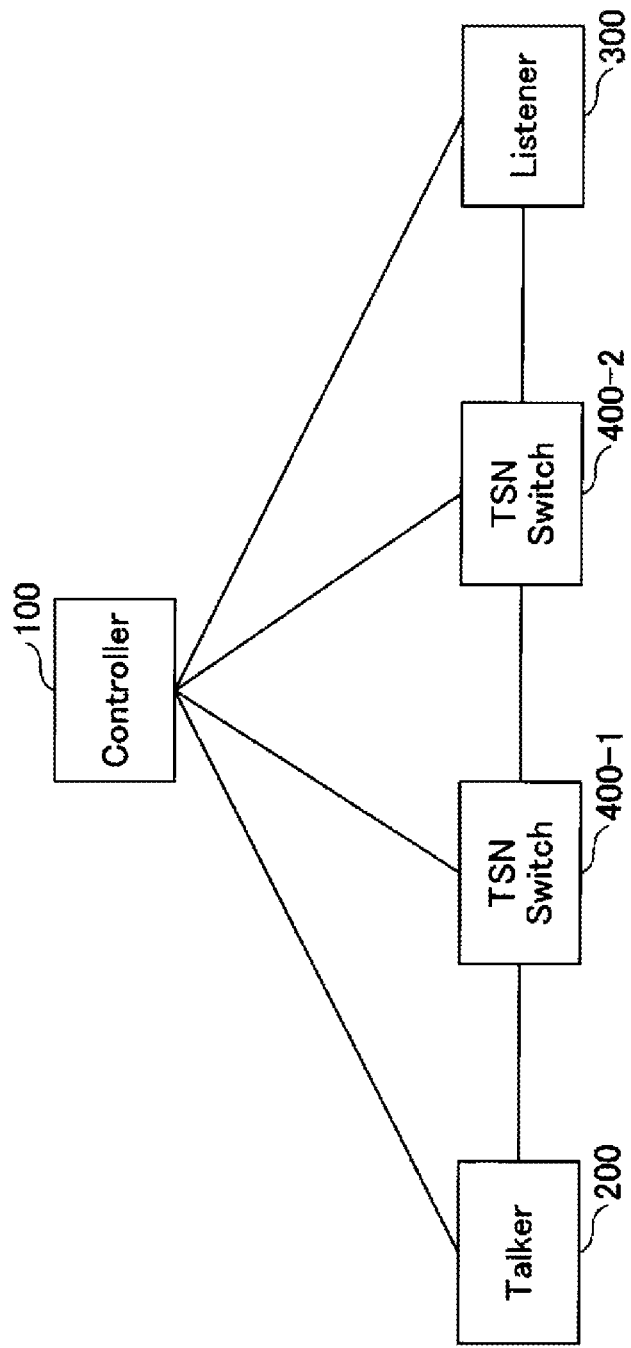
FIG. 6 is an overall configuration diagram of a system according to the present embodiment.

FIG. 6 illustrates an overall configuration example of a system according to the present embodiment. As illustrated in FIG. 6, the system includes a Controller 100, a Talker 200, a Listener 300, and TSN Switches 400 (400-1 and 400-2 in the example of FIG. 6). As described in Example 8 described below, a Proxy 500 may be provided between the Talker 200 and the TSN Switch 400-1. Furthermore, the Proxy 500 may be provided inside the Talker 200.

Transmission paths connect between the Talker 200 and a TSN Switch 400, the TSN Switches 400, and a TSN Switch 400 and the Listener 300. Furthermore, the Controller 100 and other devices are connected by control lines.

The Talker 200 is a transmission device that transmits TSN packets. The Listener 300 is a reception device that receives TSN packets. The TSN Switches 400 are transfer devices that transfer TSN packets.

The Controller 100 is a control device that manages packet transmission amounts of all the devices constituting a TSN domain and determines packet transmission timing on the basis of a jitter guarantee request from the Talker 200.

Each of the Talker 200, the Listener 300, and the TSN Switches 400 supports time synchronization such as IEEE802.1AS and ASrev and a gate opening and closing function of IEEE802.1Qbv. Note that, regarding the Talker 200 and the Listener 300, one device can also play both of these roles.

Note that the technology according to the present invention can be applied even in a case where any or all of the Talker 200, the Listener 300, and the TSN Switches 400 do not support time synchronization such as IEEE802.1AS and ASrev and a gate opening and closing function of IEEE802.1Qbv. For example, even in a case of supporting time synchronization other than IEEE802.1AS, ASrev, or the like and a gate opening and closing function other than IEEE802.1Qbv, the technology according to the present invention can be applied.

(New TSN Service Addition Procedure)

Next, a new TSN service addition procedure in the present embodiment will be described. First, for comparison, a new TSN service addition procedure assumed from existing TSN technology will be described with reference to FIG. 7.

Figure 7:
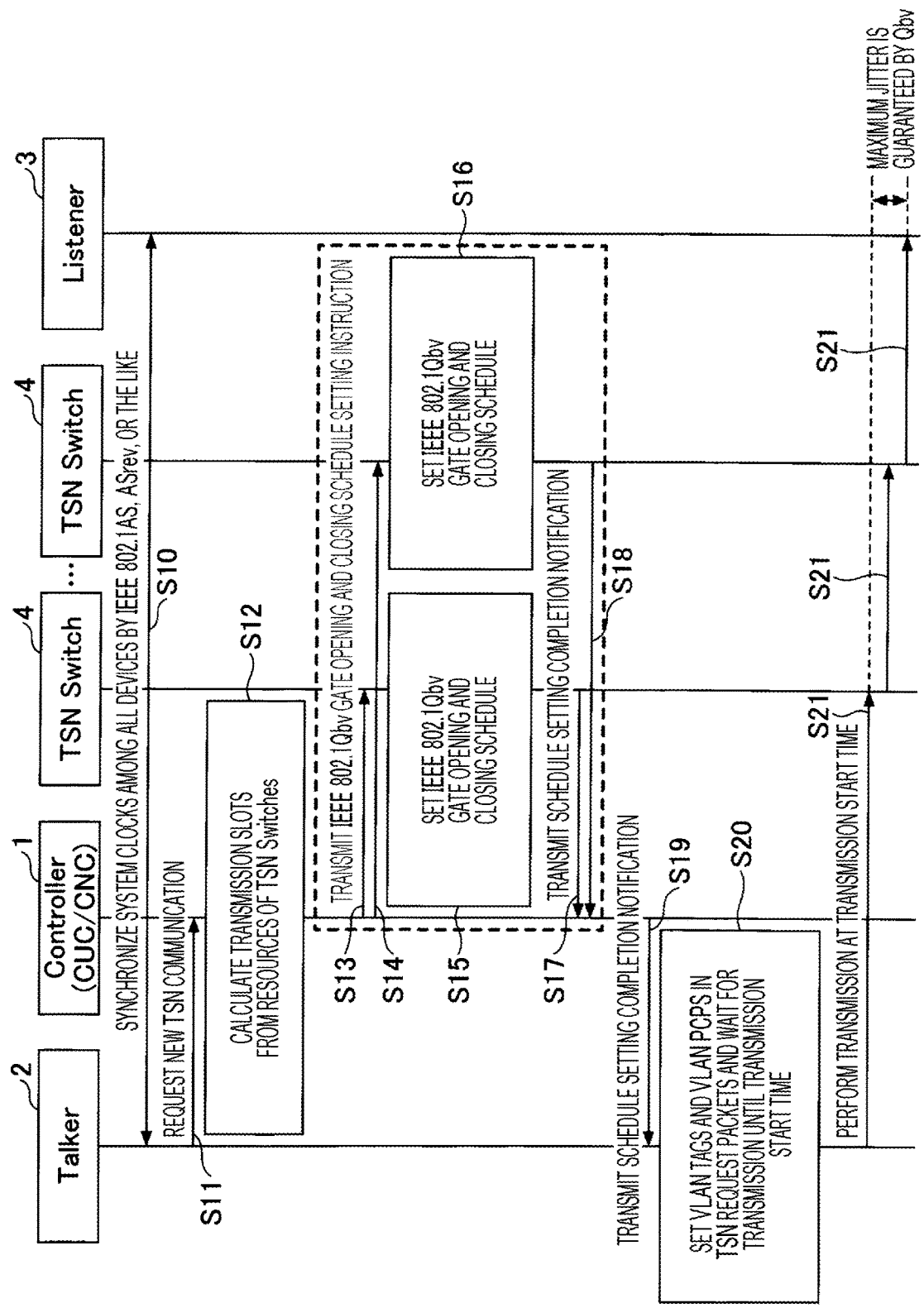
FIG. 7 is a diagram illustrating a procedure of adding a new TSN service in an existing TSN.

FIG. 7 illustrates the new TSN service addition procedure in a system including a Controller 1, a Talker 2, a Listener 3, and TSN Switches 4 in an existing TSN domain.

In S10, system clocks are synchronized among all devices by IEEE802.1AS, ASrev, or the like.

In S11, the Talker 12 transmits a new TSN communication request to the Controller 1. In S12, the Controller 1 calculates transmission slots from resources of the TSN Switches 4. In S13 and S14, the Controller 1 transmits an IEEE802.1Qbv gate opening and closing schedule setting instruction to each of the TSN Switches 4.

In S15 and S16, each of the TSN Switches 4 sets an IEEE802.1Qbv gate opening and closing schedule on the basis of the received setting instruction, and transmits a schedule setting completion notification to the Controller 1 (S17 and S18). In S19, the Controller 1 transmits a schedule setting completion notification to the Talker 2.

In S20, the Talker 2 sets VLAN tags and VLAN PCPs in TSN request packets and waits for transmission until transmission start time. The Talker 2 transmits the TSN request packets at the transmission start time (S21).

In the new TSN service addition procedure in the existing TSN, TSN Switch setting change that is processing of a portion surrounded by a dotted line frame in FIG. 7 needs to be performed every time a new TSN service is added. The same applies to release of resources.

Next, the new TSN service addition procedure in the present embodiment will be described with reference to FIGS. 8 and 9.

Figure 8:
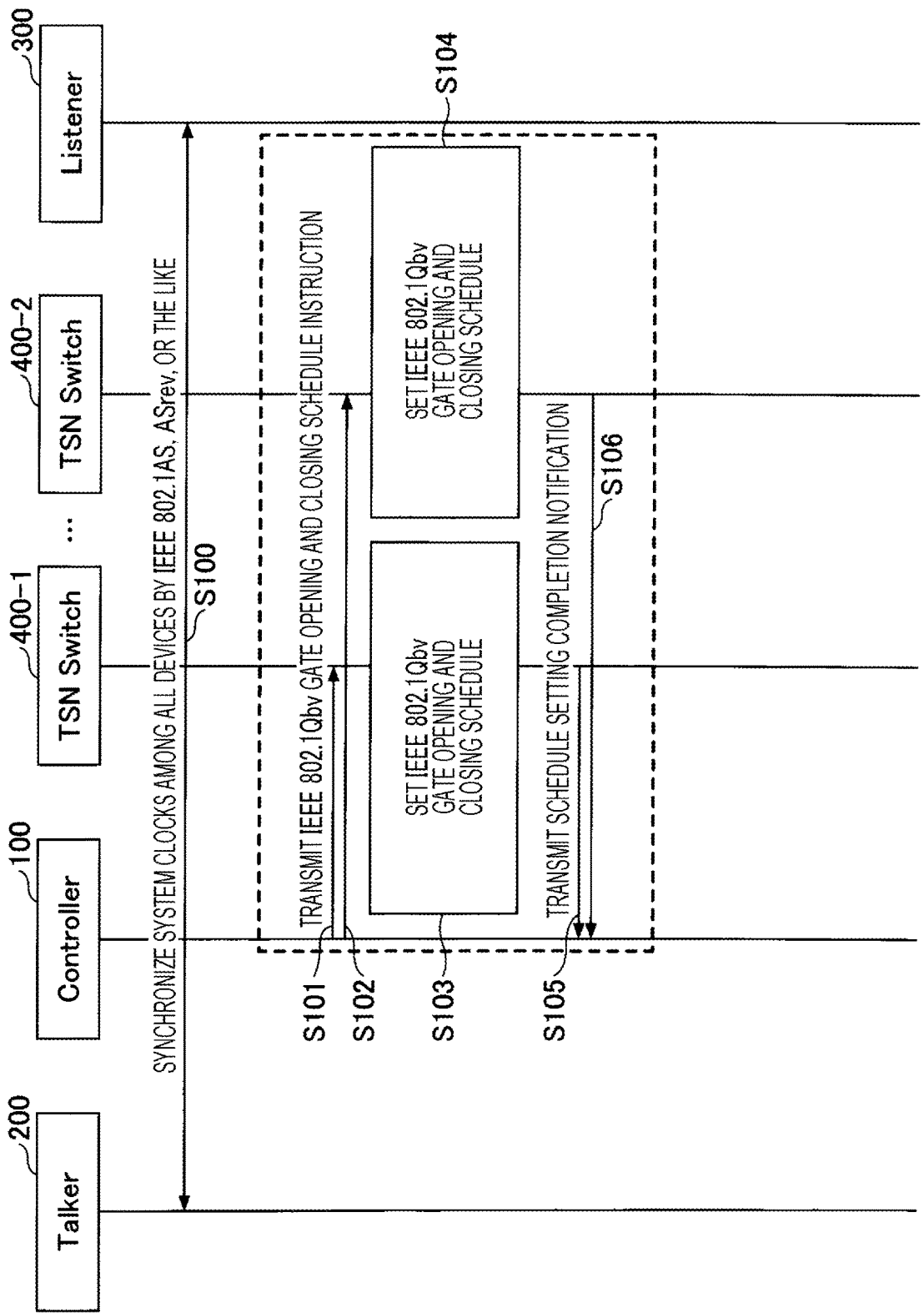
FIG. 8 is a diagram illustrating a procedure of adding a new TSN service in the present embodiment.
Figure 9:
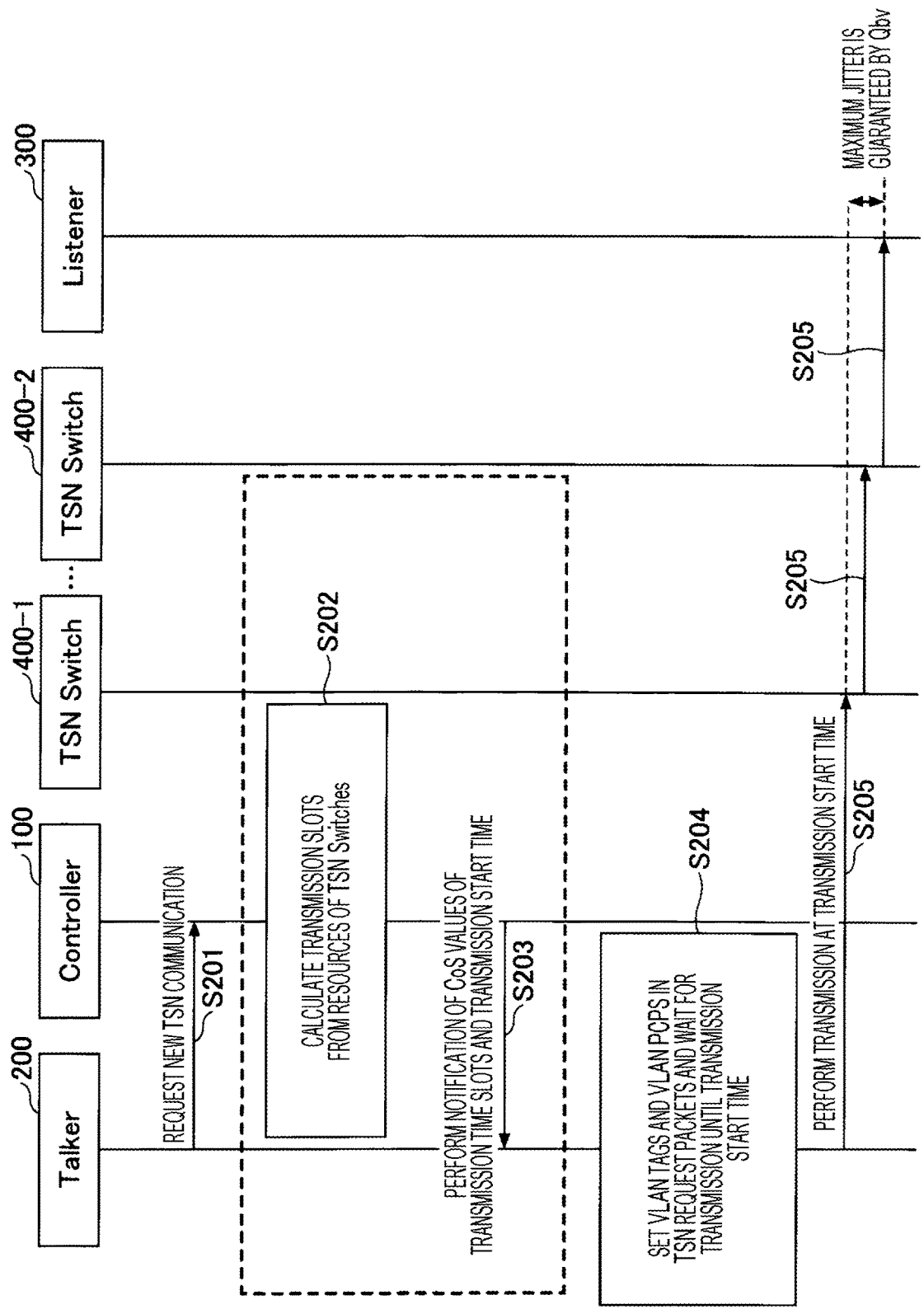
FIG. 9 is a diagram illustrating a procedure of adding a new TSN service in the present embodiment.

FIGS. 8 and 9 illustrate the new TSN service addition procedure in a system including the Controller 100, the Talker 200, the Listener 300, and the TSN Switches 400 in the present embodiment.

First, a procedure of preliminary preparation will be described with reference to FIG. 8. In S100, system clocks are synchronized among all devices by IEEE802.1AS, ASrev, or the like.

In S101 and S102, the Controller 100 transmits an IEEE802.1Qbv gate opening and closing schedule setting instruction to each of the TSN Switches 400.

In S103 and S104, each of the TSN Switches 400 sets an IEEE802.1Qbv gate opening and closing schedule on the basis of the received setting instruction, and transmits a schedule setting completion notification to the Controller 100 (S105 and S106).

In the present embodiment, the gate opening and closing schedule setting needs to be performed only for a first time. However, in a case where the band allocation ratio of priority classes and a non-priority class is changed, resetting is performed.

The procedure performed when a new TSN service is added will be described with reference to FIG. 9. In S201, the Talker 200 transmits a new TSN communication request to the Controller 100. In S202, the Controller 100 calculates transmission time slots from resources of the TSN Switches 400. In S203, the Controller 100 notifies the Talker 200 of the CoS values of the transmission time slots and transmission start time.

In S204, the Talker 200 sets VLAN tags and VLAN PCPs in TSN request packets and waits for transmission until transmission start time. The Talker 200 transmits the TSN request packets at the transmission start time (S205).

In the present embodiment, when a new TSN service is added, the Controller 100 only performs resource calculation, and setting for the TSN Switches 400 is unnecessary. Similarly, when resources are released, only the Controller 100 performs processing.

(Device Configuration and TSN Communication Start Procedure)

Next, device configurations of the Talker 200 and the Controller 100 in the present embodiment and a TSN communication start procedure will be described. The TSN communication start procedure described herein is detailed description of the new TSN service addition procedure illustrated in FIG. 9.

Figure 10:
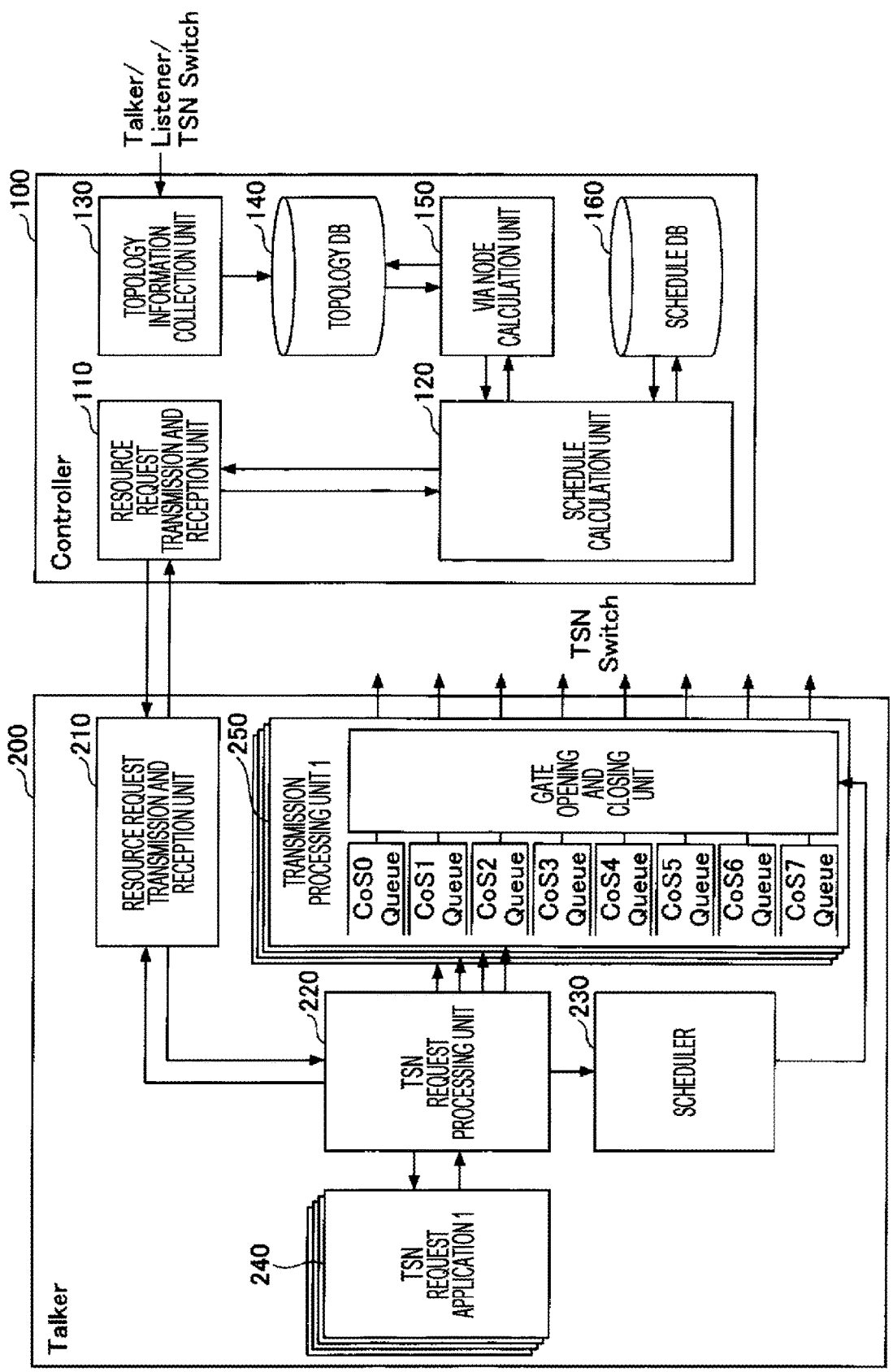
FIG. 10 illustrates device configurations of a Talker 200 and a controller 100.

FIG. 10 illustrates device configurations of the Talker 200 and the Controller 100. As illustrated in FIG. 10, the Talker 200 includes a resource request transmission and reception unit 210, a TSN request processing unit 220, a scheduler 230, TSN request applications 240, and transmission processing units 250.

FIG. 10 illustrates that a plurality of TSN request applications 240 and a plurality of transmission processing units 250 are provided. Each of the plurality of transmission processing units 250 may correspond to one transmission port.

A transmission processing unit 250 includes queues for respective CoSes and a gate opening and closing unit, and gate opening and closing of each of the queues is performed according to an instruction from the scheduler 230. A packet in a queue is transmitted when the gate is opened.

The Controller 100 includes a resource request reception unit 110, a schedule calculation unit 120, a topology information collection unit 130, a topology DB 140, a via node calculation unit 150, and a schedule DB 160. Note that the resource request reception unit 110 and the schedule calculation unit 120 may be collectively referred to as a schedule processing unit.

The TSN Switches 400 may have configurations similar to those of the existing TSN Switches that support time synchronization such as IEEE802.1AS or ASrev and a gate opening and closing function of IEEE802.1Qbv.

Operation of each functional unit in the Talker 200 and each functional unit in the Controller 100 will be described in the following TSN communication start procedure.

The TSN communication start procedure is as follows. Hereinafter, the description will be given in the order of step numbers indicated by S1 and the like.

<S1>

A TSN request application 240 in the Talker 200 notifies the TSN request processing unit 220 of a transmission request amount, a transmission frequency, and allowable jitter of TSN communication.

<S2>

The TSN request processing unit 220 in the Talker 200 transmits a resource allocation request including a transmission and reception address, the transmission request amount, the transmission frequency, and the allowable jitter (the request may be referred to as a communication request) to the Controller 100 via the resource request transmission and reception unit 210. The resource allocation request is received by the resource request transmission and reception unit 110 in the Controller 100.

Note that procedures of S1 and S2 may be performed not by the Talker 200 but by the CUC of Non Patent Literature 2.

<S3>

Here, it is assumed that the topology information collection unit 130 collects topology information from the TSN domain in advance and stores the topology information in the topology DB 140. The topology information can be acquired by various existing telemetry methods in addition to use of a link layer discovery protocol (LLDP), a simple network management protocol (SNMP), or the like.

The via node calculation unit 150 in the Controller 100 calculates via nodes of communication related to the communication request from the topology information collected in advance from the TSN domain and the transmission and reception address at which the request is made.

<S4>

The schedule DB 160 stores schedules of respective nodes. The schedule calculation unit 120 in the Controller 100 refers to the schedules for the respective via nodes, secures a time slot that satisfies the transmission request amount, a period, and the like, and notifies the Talker 200 of information of the time slot via the resource request transmission and reception unit 110.

<S5>

The TSN request processing unit 220 of the Talker 200 sets the information of the time slot (such as a CoS value and transmission timing) allocated from the Controller 100 in the scheduler 230, sets a CoS for data transmitted from the TSN request application 240 before the transmission timing, and sends the data to the transmission processing units 250.

<S6>

The transmission data is distributed to the queues prepared for the respective CoSes in the transmission processing units 250, and gate opening and closing of the transmission processing units 250 is performed on the basis of the transmission timing set in the scheduler 230, and the transmission data is transmitted to the TSN switches 400.

<S7>

In a case where reception timing needs to be synchronized with the Talker 200 on the Listener 300 side, the Talker 200 or the Controller 100 may notify the Listener 300 of transmission time and guaranteed delay time.

(Summary of Examples, Pre-Scheduling, Rules of Resource Allocation)

Hereinafter, the technology according to the present embodiment will be described in detail using Examples 1 to 8. The outline of each example is as follows. Example 1 is the basis, and other examples are basically modifications and additions to Example 1. Furthermore, Examples 1 to 8 can be implemented in any combination as long as there is no contradiction.

Example 1: A method in which resource allocation in which propagation delay is ignored is performed for one-time TSN communication Example 2: A method in which resource allocation in which propagation delay is considered is performed for one-time TSN communication Example 3: A resource allocation method for periodic TSN communication Example 4: A method in which periodic schedules are set in advance for periodic TSN communication Example 5: A release method for allocated resources Example 6: A changing method for allocated resources Example 7: A schedule management method Example 8: A method for using a Proxy that, as a proxy, performs TSN request and transmission processing Before describing specific processing in each example, first, basic rules of scheduling and resource allocation in the present embodiment will be described. However, the following rules are examples in the present embodiment, and the present invention is not limited to the following rules.

Transmission schedules are independent for respective transmission ports of devices included in the TSN domain.

Each of the transmission schedules is divided into time slots of constant time (T) from reference time shared in the TSN domain, and each of the time slots has one or more CoSes for permitting transmission.

A CoS value 0 is set to non-priority communication. Priority classes for controlling PTP or the like are omitted in the present embodiment.

A minimum time slot group in which time slots of a specific transmission permission class are periodically repeated is defined as one cycle.

The amount of transmittable data in each of the time slots is represented by a value obtained by normalizing a link band B of a transmission port and time slot time T using 64 bytes that is the minimum frame size of Ethernet.

For example, in a case where the link band is 100 Gbps and the time slot time is 10 us, 100 Gbps*10 us/64 bytes≈2000 is the amount of transmittable data in this time slot. This means that up to about 2000 Etherframes of 64 bytes can be transmitted (serialized) within 10 us.

The Controller 100 manages remaining transmittable amounts for the respective time slots in each transmission port. The remaining transmittable amounts of data for the respective time slots may be referred to as "schedules".

Figure 11:
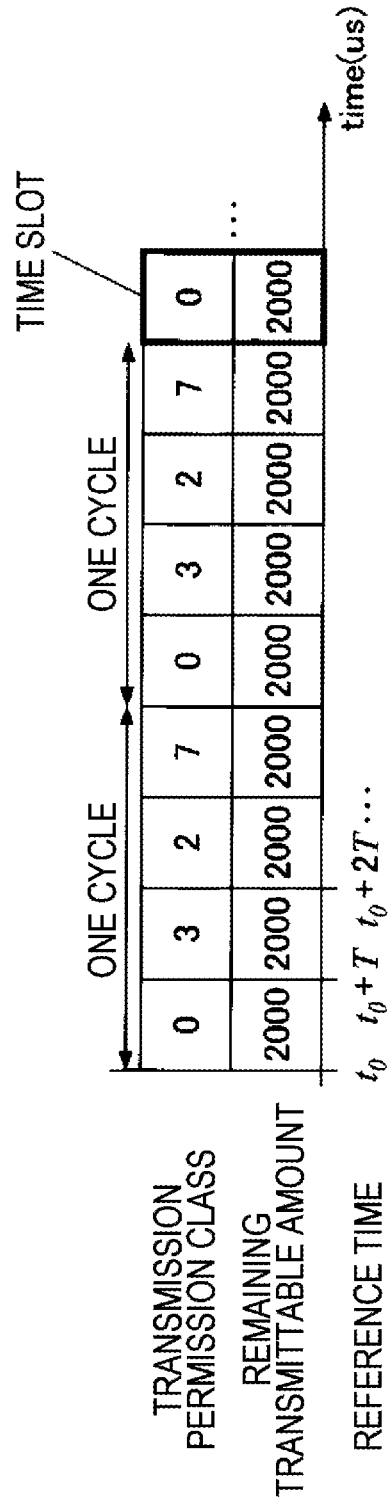
FIG. 11 is a diagram for describing scheduling and resource allocation.
Figure 12:
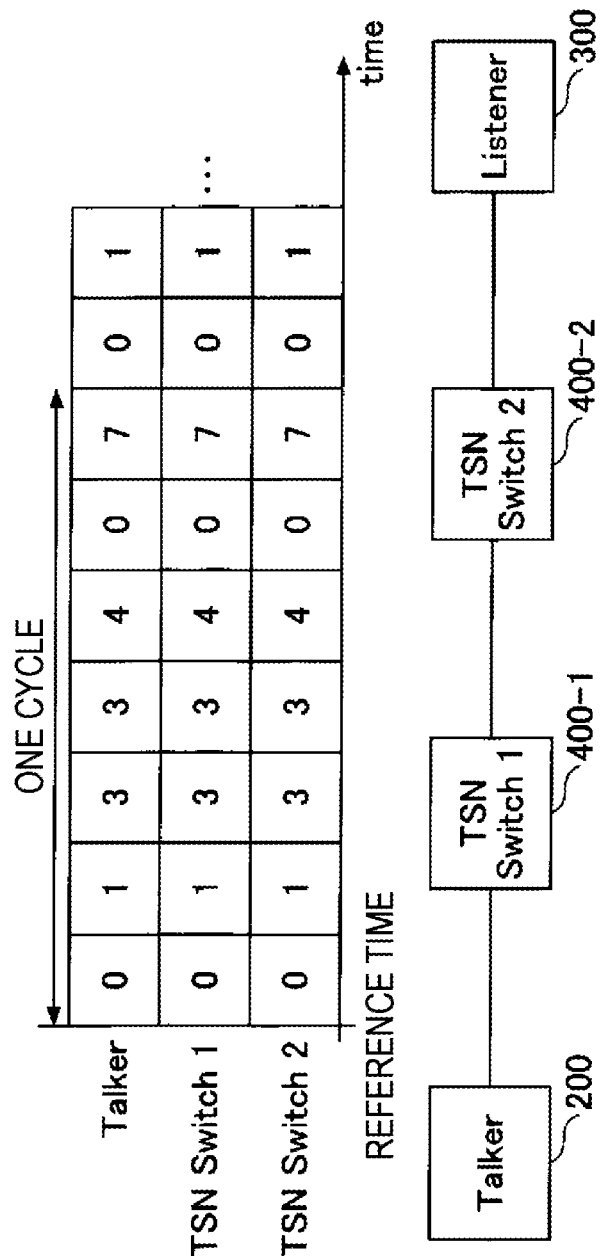
FIG. 12 is a diagram for describing Example 1.

FIG. 11 illustrates an example of time slots and cycles. In the example of FIG. 11, since transmission permission classes of respective time slots are repeated as 3, 2, 7, 0, 3, 2, 7, . . . , four time slots in which 0, 3, 2, and 7 are set form one cycle. Furthermore, FIG. 12 illustrates that remaining transmittable amounts are managed for the respective time slots.

Hereinafter, each example will be described.

Example 1

In Example 1, a method for pre-scheduling and resource allocation that are the basis of the technology according to the present embodiment will be described using an example of resource allocation for one-time communication in which propagation delay is ignored. In Example 1, it is assumed that propagation delay between network devices is sufficiently smaller than the time slot time and can be ignored.

One time slot is shared by a plurality of Talkers and TSN services. Furthermore, scheduling of time slots is set to be fixed, and the Controller 100 manages and controls only transmission amounts in the time slots.

Example 1: Pre-Scheduling Method

In pre-scheduling in Example 1, the same scheduling is set for all transmission ports of all devices by the Controller 100. As for the content of schedules, a non-priority class (CoS value 0) and one or more priority classes (CoS values 1 to 7) are freely set for one cycle. As described in FIG. 8, in this setting, the pre-scheduling (information indicating which CoS queue is allocated to which time slot [gate opening timing]) is set from the Controller 100 to the TSN Switches 400 only for a first time.

FIG. 12 illustrates an example of pre-schedules. In the example illustrated in FIG. 12, 0, 1, 3, 3, 4, 0, and 7 are set as one cycle of schedules for respective transmission ports of the Talker 200, the TSN Switch 400-1, and the TSN Switch 400-2. This setting content is held (managed) in the schedule DB 160 of the Controller 100. Furthermore, each of the TSN Switches 400 is notified of this schedule and setting is performed in each of the TSN Switches 400 only for a first time.

Note that, in each example, the processing related to the setting of the pre-scheduling may be performed by the schedule calculation unit 120 (schedule processing unit). That is, the schedule calculation unit 120 (schedule processing unit) may include both a resource allocation calculation function and a pre-scheduling setting function.

Example 1: Resource Allocation Method

Next, a resource allocation method in Example 1 will be described.

In the Controller 100, the schedule calculation unit 120 acquires remaining transmittable amounts of respective transmission ports that are via points between the Talker 200 and the Listener 300 by referring to the schedule DB 160, and calculates the minimum values of the respective time slots (minimum values between transmission ports) other than the non-priority communication. Note that the calculation amount for this calculation is O (nm) for the number of hops n and the number of time slots m.

FIG. 13 illustrates an example. In the example illustrated in FIG. 13, for example, in a second time slot from the left having a priority communication class=1, the remaining transmittable amount of the Talker 200 is 500, the remaining transmittable amount of the TSN Switch 400-1 is 1000, and the remaining transmittable amount of the TSN Switch 400-2 is 1200, and thus the minimum value is 500.

In the time slot at the right end of FIG. 13, the minimum value is 200, and in a case where data transmission is started from the Talker 200 at start time of this slot (time indicated by A), the data reaches a destination with queuing delay of 10 us or less as long as the data is 200*64 bytes or less.

Next, the schedule calculation unit 120 selects a time slot having a minimum value that satisfies a transmission request amount, and subtracts a transmission request amount from corresponding time slots of schedules of respective nodes.

Figure 14:
FIG. 14 is a diagram for describing Example 1.

FIG. 14 illustrates an example. The example illustrated in FIG. 14 is a case where a transmission request amount is 1000. In this case, since the minimum value 1200 of a time slot having a priority communication class=7 satisfies the transmission request amount, the time slot is selected, and the transmission request amount is subtracted from corresponding slots of respective schedules.

Figure 15:
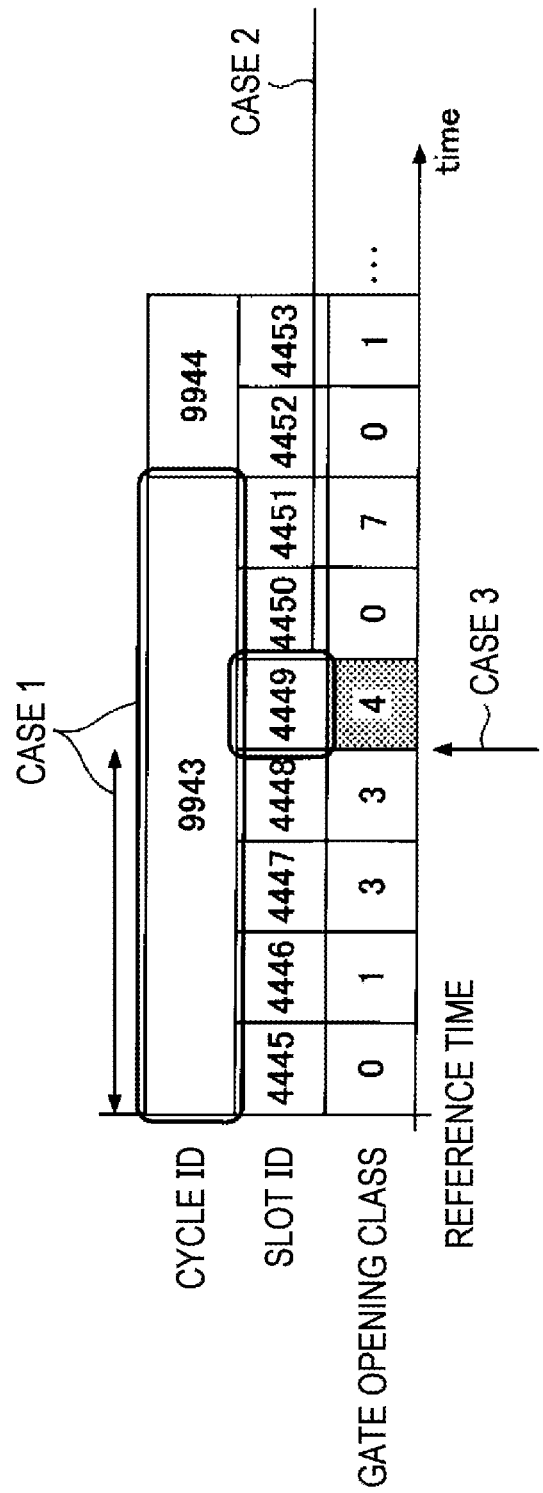
FIG. 15 is a diagram for describing Example 1.

Subsequently, the scheduling calculation unit 120 notifies the Talker 200 of information related to the selected transmission time slot via the resource request transmission and reception unit 110. Cases 1 to 3 will be described with reference to FIG. 15 as examples of a more specific transmission time slot specification method. Any method of cases 1 to 3 may be used. Furthermore, any two or all of cases 1 to 3 may be used in combination. Note that, in an example in which IDs are used, it is assumed that schedulers of the Talker 200 and the Controller 100 manage the same IDs.

In case 1, the scheduling calculation unit 120 allocates cycle IDs shared in the TSN domain for respective minimum units in which the same schedules are repeated, and notifies the Talker 200 of a cycle ID and elapsed time from the start of the cycle.

In case 2, the scheduling calculation unit 120 allocates slot IDs shared in the TSN domain for respective time slots, and notifies the Talker 200 of a slot ID.

In case 3, the scheduling calculation unit 120 notifies the Talker 200 of a time stamp value in nanoseconds of time slot start time.

Example 1: Mechanism of Jitter Guarantee

Figure 16:
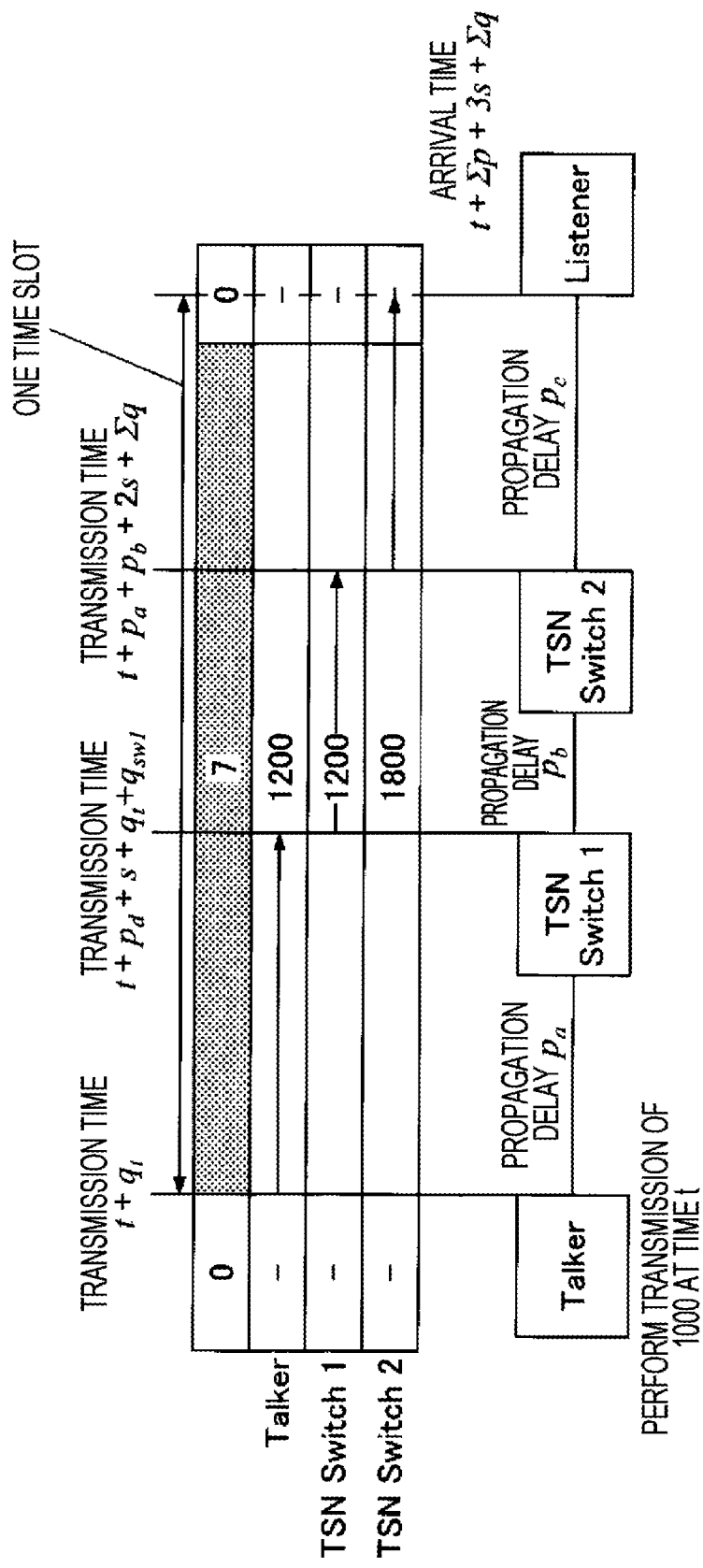
FIG. 16 is a diagram for describing Example 1.

A mechanism of a jitter guarantee in Example 1 is illustrated in FIG. 16. FIG. 16 corresponds to the example illustrated in FIG. 14. That is, one-time communication of 1000 is performed in the time slot having a priority communication class=7 illustrated in FIG. 14.

As illustrated in FIG. 16, in a case where the Talker 200 performs data transmission of 1000 at time t, data arrival time is "t+Σp+3s+Σq" due to serialization delay, queuing delay, and propagation delay. In this calculation, "Σp+3s" is fixed delay. Provided that, it is assumed that path delay and forwarding delay are constant. Furthermore, Σq is fluctuation delay (jitter), and is 10 us at the maximum because the transmission amount is adjusted. That is, since the transmission amount of one time slot of all the devices is suppressed to 2000 or less by the Controller 100, transmission can be reliably performed within one time slot=10 us.

Note that 1 Mbit can be processed in one time slot only in a case where there is data to be processed at all times, and thus, in a case where propagation delay is not sufficiently small compared to an interval of time slots, 1 Mbit cannot be transmitted. Furthermore, in actuality, processing delay of gate opening and closing needs to be considered.

Example 1: Allocation of Time Slots Having Priority Classes (CoSes 1 to 7) to Non-Priority Class (CoS 0)

In Example 1, a jitter guarantee can strictly be performed by one time slot being allocated to only one CoS as described above. However, since bands need to be fixedly allocated in advance, band utilization efficiency decreases.

In order to avoid this, a gate of a non-priority class CoS 0 may also be opened for time slots to which priority class CoSes 1 to 7 are allocated, and the CoSes 1 to 7 may be set to high priority strict priority queueing and the CoS 0 may be set to low priority strict priority queueing (the queue of the CoS 0 performs transmission processing only in a case where the queues of the CoSes 1 to 7 are empty). As a result, in a case where there is no frame of the priority classes, a frame of the non-priority class can be transmitted.

Figure 17:
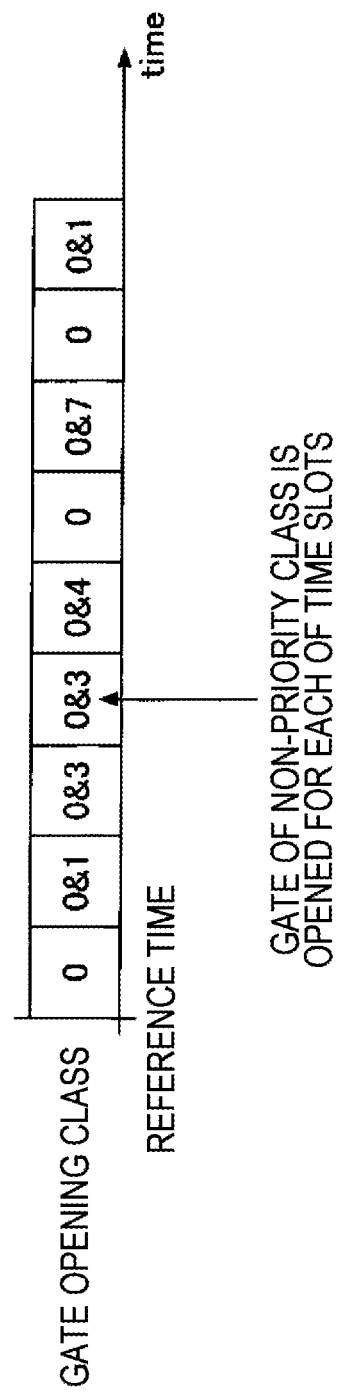
FIG. 17 is a diagram for describing Example 1.
Figure 18:
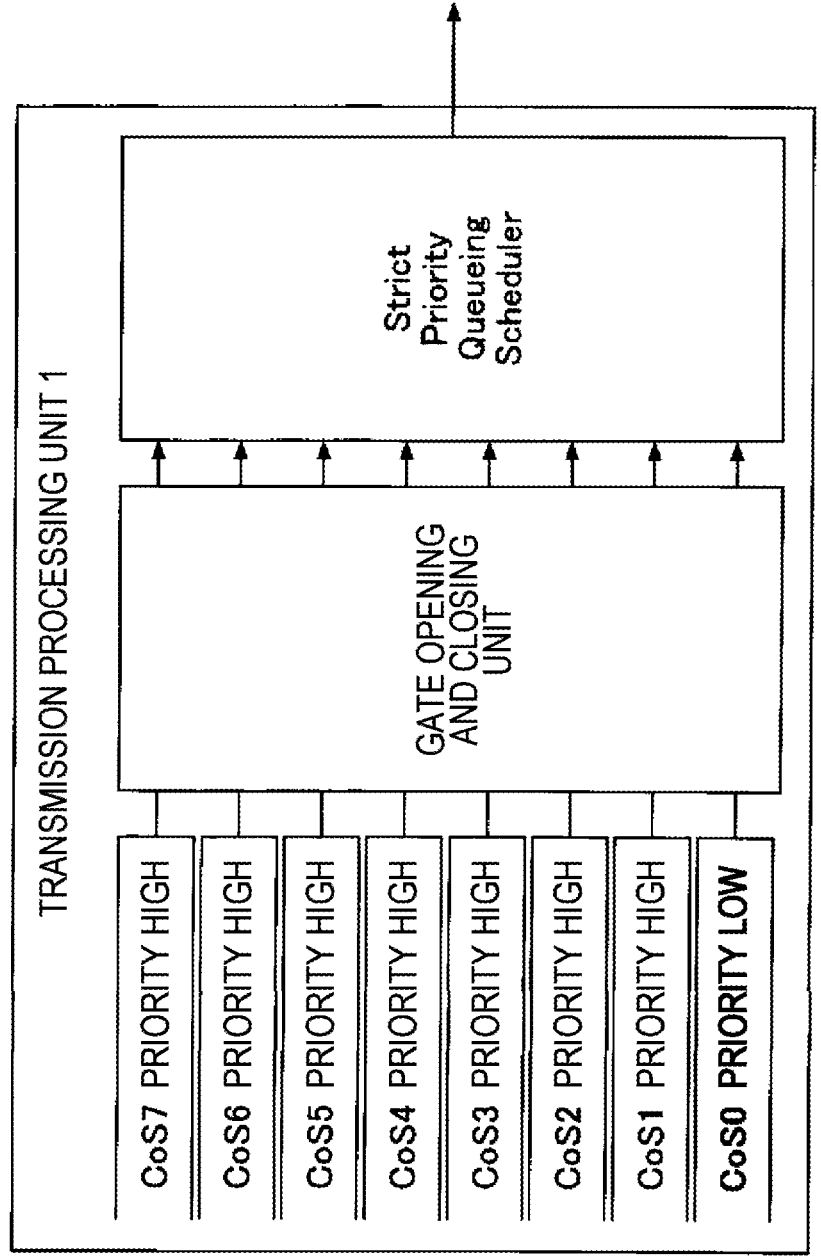
FIG. 18 is a diagram for describing Example 1.

FIGS. 17 and 18 illustrate examples. As illustrated in FIG. 17, in the pre-scheduling, time slots allocated to the priority classes are further allocated to the non-priority class (CoS 0). For example, 0 & 3 means that the non-priority class 0 and a priority class 3 are allocated.

As illustrated in FIG. 18, in this case, the queue of the CoS 0 can perform transmission only in a case where all the gates of the queues of the CoSes 1 to 7 are closed or the queues are empty.

However, in this case, in a case where frames of the priority classes arrive at a communication device during transmission of the frame of the non-priority class, serialization delay of up to one frame the number of interruptions occurs as jitter. This can be solved by a measure used in combination with frame interrupt control of IEEE802.1Qbu such as limiting the transmission amounts of the non-priority class of the respective time slots to certain amounts and allocating remaining transmittable amounts in consideration of the serialization delay of the non-priority class.

Example 2

Next, Example 2 will be described. In Example 2, resource allocation in a case where IEEE802.1Qbv and IEEE802.1Qch are combined will be described as resource allocation for one-time communication in consideration of propagation delay.

That is, in Example 2, IEEE802.1Qch cyclic queuing of the TSN standard specification is applied to the pre-scheduling, and in this case, since transmission time slots of priority classes of each device change, resource allocation calculation is performed in consideration of the time slot shift.

Note that IEEE802.1Qch is a method for performing transmission processing in a next time slot of a time slot in which a frame is received. In this method, waiting time of up to one time slot is generated for each hop, but delay of (the number of hops−1)*time cycle time to (the number of hops 1)*time cycle time can be guaranteed.

Example 2: Pre-Scheduling Method

In Example 2, IEEE802.1Qch is applied by gate opening and closing time slots of Qbv being set by the Controller 100 as follows.

That is, in Example 2, two CoS values are used for priority classes, and the two CoS values are allocated to the schedules of the respective transmission ports such that time slots of the two priority classes alternately appear at equal intervals. Furthermore, an interval between the priority classes is set to be larger than the maximum propagation delay among links included in the TSN domain. The interval between the priority classes is a time length from start time of a time slot of one of the two priority classes to a start time of a time slot of the other one of the priority classes.

Furthermore, the same schedules are set for all transmission ports of the same device, and schedules are set such that different priority classes are assigned to the same time between adjacent devices.

Figure 19:
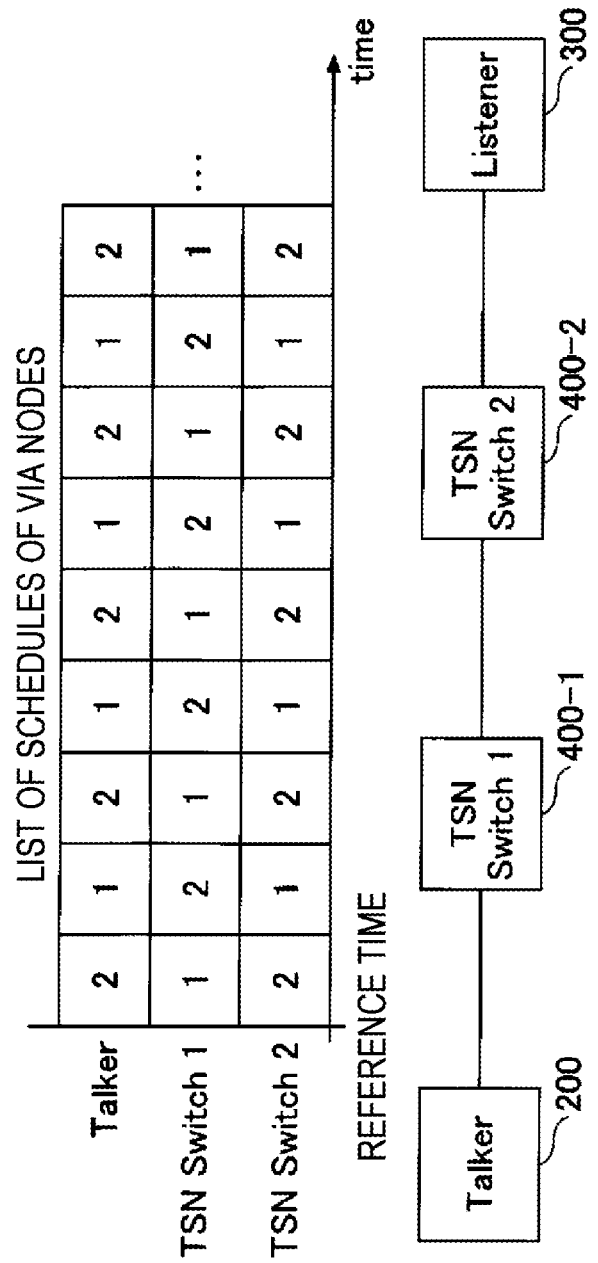
FIG. 19 is a diagram for describing Example 2.

FIG. 19 illustrates an example. The example illustrated in FIG. 19 is an example in which CoS values 1 and 2 are used for TSN. As illustrated in FIG. 19, schedules are set such that different priority classes are assigned to the same time between adjacent devices.

Furthermore, a best effort class can be included as illustrated in FIGS. 20 and 21, or time slot time can be changed as illustrated in FIG. 21.

Example 2: Resource Allocation Method

Next, a resource allocation method in Example 2 will be described.

In Example 2, similarly to Example 1, the schedule calculation unit 120 of the Controller 100 compares remaining transmittable amounts of respective via transmission ports. However, in Example 2, schedules are shifted by half cycle for respective hops, and the minimum values of respective time slots are calculated. The calculation amount in Example 2 is the same as that in Example 1.

After a time slot that satisfies a transmission request amount is selected from the minimum values, the same procedure as in Example 1 is performed.

Figure 22:
FIG. 22 is a diagram for describing Example 2.

FIG. 22 illustrates an example. The example of FIG. 22 is an example of a case where pre-scheduling is performed such that time slots of a priority class 1 and time slots of a priority class 2 appear alternately at equal intervals, and different priority classes are assigned at the same time between the adjacent devices as illustrated in FIG. 19.

As illustrated in FIG. 22, a schedule for the TSN Switch 400-1 that is the next hop of the Talker 200 is shifted by a half cycle (in this case, one time slot), and a schedule for the TSN Switch 400-2 that is the next hop is shifted in the same direction by a half cycle. In this state, the minimum values of remaining transmittable amounts for respective time slots are calculated by the same processing as in Example 1, and a time slot that satisfies a transmission request amount is selected.

Example 2: Mechanism of Jitter Guarantee

Figure 23:
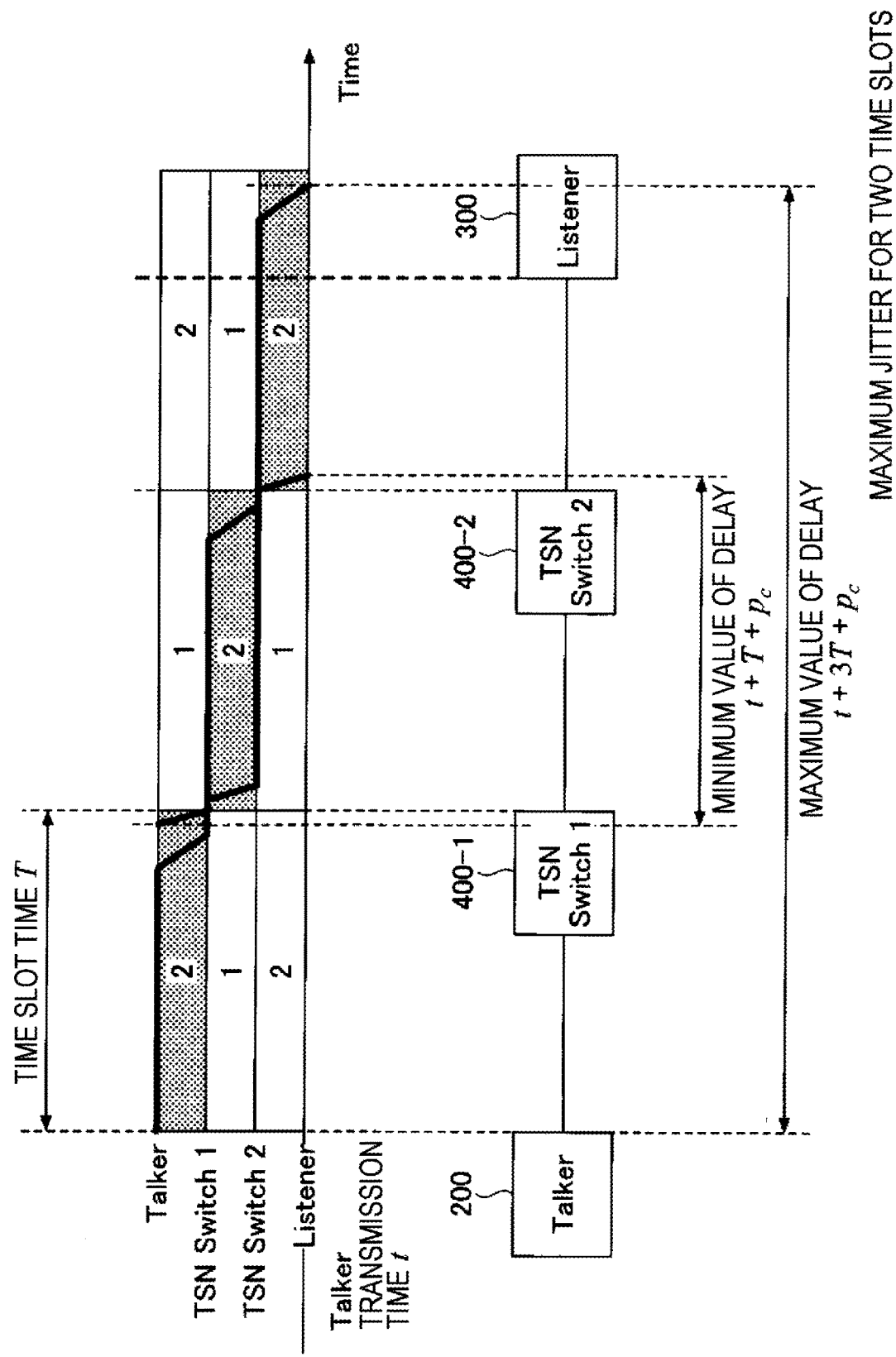
FIG. 23 is a diagram for describing Example 2.

A mechanism of a jitter guarantee in Example 2 is illustrated in FIG. 23. In the example of FIG. 23, classification into only two classes is performed, and schedules are set such that transmission time slots appear at equal intervals between any two devices in the TSN domain. As illustrated in FIG. 23, the arrival time of a packet transmitted at the time t to the Listener 300 is $t+T+p_c$ to $t+3T+p_c$, and the maximum jitter is for two time slots.

Example 3

Next, Example 3 will be described. In Example 3, a basic example of a resource allocation method of TSN communication in which transmission is periodically repeated will be described.

In Example 3, the selection of a time slot that satisfies a transmission request amount described in Example 1 or Example 2 is repeatedly performed every time period, so that resources of periodic TSN communication is secured.

Example 3: Pre-Scheduling Method

Pre-scheduling method in Example 3 applies the pre-scheduling method in Example 1 or 2.

Example 3: Resource Allocation Method

Next, a resource allocation method in Example 3 will be described.

<S1>

The schedule calculation unit 120 applies Example 1 or 2 and calculates the minimum values of remaining transmittable amounts between the transmission ports for the respective time slots in the pre-scheduling.

<S2>

The schedule calculation unit 120 selects a first transmission time slot possibility of periodic communication, and in a case where the minimum value calculated in S1 is equal to or larger than a transmission request amount, repeatedly searches whether the minimum value of a time slot that is ahead by a time period satisfies the transmission request amount.

Note that how many times a time slot that is ahead by a time period should be searched may be determined according to the number of cycles of schedules managed by the Controller 100. For example, in a case where only one cycle is managed and the period is the same as the cycle, only one cycle may be examined. Furthermore, how many times a time slot that is ahead by a time period should be searched may be determined on the basis of the time length of the periodic communication requested by a communication request from the Talker 200.

<S3>

In a case where time slots of all transmission possibilities in the schedules satisfy the transmission request amount, the transmission request amount is subtracted from remaining transmittable amounts of the time slots of the respective transmission possibilities, and the Talker 200 is notified of information of the first transmission time slot.

<S4>

In a case where there is no time slot that satisfies the transmission request amount, the first transmission time slot is changed to one slot ahead, and the search is repeated. In a case where all the time slots are searched and there is no possibility that satisfies the transmission request amount, the Talker 200 is notified of information indicating that resource allocation is not permitted.

The above is a procedure example of the resource allocation in the Controller 100. FIG. 24 illustrates an example.

The example of FIG. 24 is an example of a case where an interval is 50 us and the transmission request amount is 100. In the example of schedules of respective nodes (transmission ports) illustrated in FIG. 24, it is assumed that the schedule calculation unit 120 selects a time slot illustrated by A as a first transmission time slot possibility. Since the minimum value in the time slot indicated by A is 100 or more, whether the minimum value in a time slot indicated by B that is a time slot ahead by a time period is 100 or more is checked. Since the minimum value is 100 or more, whether the minimum value in a time slot indicated by C that is a time slot ahead by a time period is 100 or more is checked. Here, since the minimum value is 100 or more, time slots of all transmission possibilities in the schedules satisfy the transmission request amount, and thus the transmission request amount is subtracted from remaining transmittable amounts of the time slots of the respective transmission possibilities, and the Talker 200 is notified of information of the first transmission time slot. Note that, here, it is assumed that communication is performed three times as periodic communication.

In the example of FIG. 24, the transmission request amount is subtracted from remaining transmittable amounts of time slots A, B, and C, and the Talker 200 is notified of information of the time slot indicated by A that is the first transmission time slot.

The Talker 200 selects a time slot for each time period from the first transmission time slot in the notification from the Controller 100 and transmits data of a TSN application.

In the resource allocation procedure, in a case where a remaining transmittable amount of a time slot that is a transmission possibility falls below the transmission request amount, a neighboring time slot that satisfies the transmission request amount may be alternatively selected within the range of allowable jitter in the notification from the Talker 200, and the Talker 200 may be notified of the alternative time slot.

For example, in the example of FIG. 24, in a case where the minimum value of the time slot indicated by B is 50, that is, in a case where the remaining transmittable amount falls below the transmission request amount, if the remaining transmittable amount falls within the range of the allowable jitter, a time slot indicated by D can be selected as an alternative to the time slot indicated by B.

Example 3: Calculation Amount

For the number of hops n and the number of time slots m, the minimum value of the remaining transmittable amounts for respective via transmission ports is calculated as O (nm). Search for a time slot that satisfies a transmission request amount is m*O (1)=O (m) at the worst value, and is a constant multiple of O (m) at most even in a case where a shift from the period of time slots is allowed. The total calculation amount is O (nm)+O (m)=O (nm), and the order is the same as the calculation amount of one-time communication.

However, although search can be performed for every time slot in one-time communication, in periodic communication, all transmission time slots included in at least one cycle needs to be searched, and thus the calculation amount is usually larger in periodic communication.

Example 4

Next, Example 4 will be described. In Example 4, a method of setting periodic schedules in advance will be described as a method of efficiently performing resource allocation of TSN communication in which transmission is periodically repeated.

In Example 4, time slots of a representative period (1000 Hz, 360 Hz, or the like) are set to the same class, and resource management is uniformly performed. As a result, calculation time of the resource allocation of the Controller 100 is reduced, and change of CoS values for each transmission by the Talker 200 is unnecessary.

A time slot of 1000 Hz can be used in communication at a transmission frequency of 1, 2, 4, 5, 8, 10, 20, 25, 50, 100, 125, 200, 500, and 1000 Hz. Furthermore, a time slot of 360 Hz can be used in communication at a transmission frequency of 1, 2, 3, 4, 5, 6, 8, 9, 10, 12, 18, 20, 24, 30, 36, 40, 45, 60, 72, 90, 120, 180, and 360 Hz.

Example 4: Pre-Scheduling Method

A pre-scheduling method in Example 4 is described.
<S1>
The schedule calculation unit 120 of the Controller 100 selects one or more sets of a period of time slots set in advance and a class corresponding to the period.
<S2>
The schedule calculation unit 120 selects, for one class, a first time slot to which the class is allocated, and allocates a time slot to the class for each time period. In a case where a time slot has already been allocated to any class, a neighboring time slot is selected.

In the scheduling procedure, a plurality of sets of time slots having the same period and a class may be set by the first time slot being changed.

A schedule set as described above is stored in the schedule DB 160.

Figure 25:
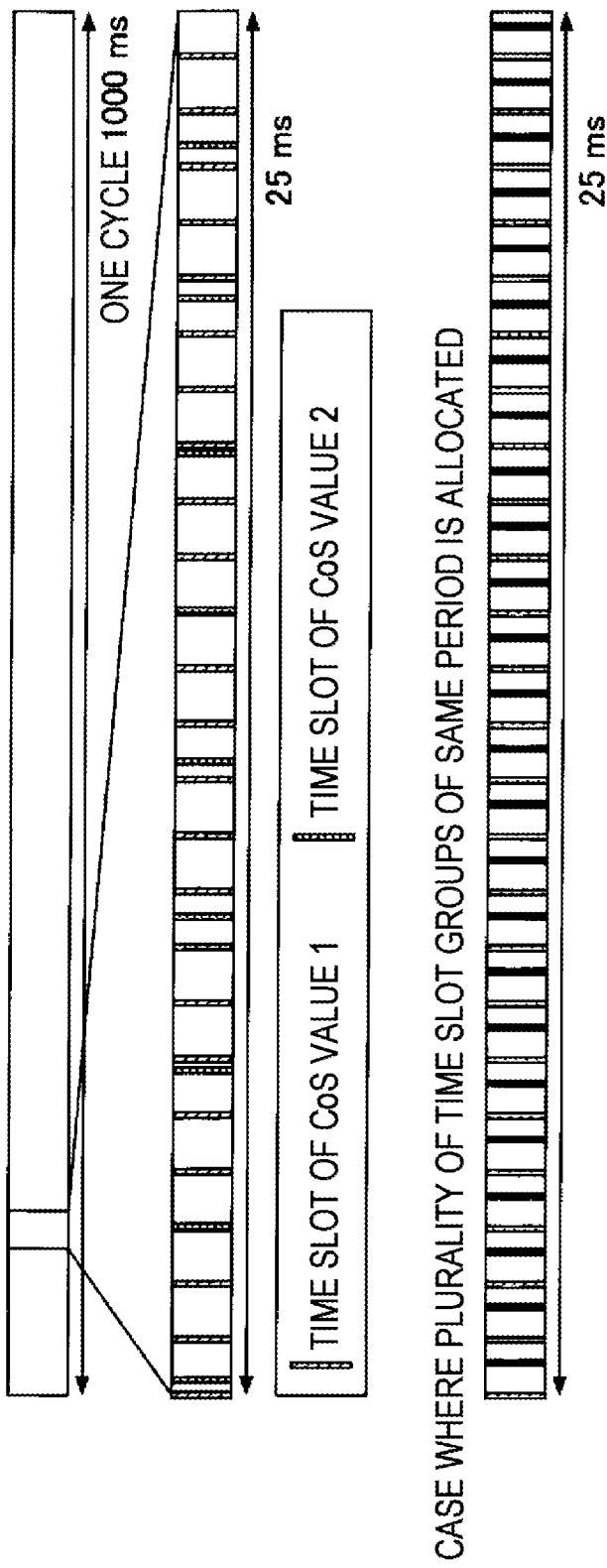
FIG. 25 is a diagram for describing Example 4.

FIG. 25 illustrates an example. The example of FIG. 25 is an example of a case where pre-scheduling is performed assuming that 1000 Hz is a CoS value 1 and 360 Hz is a CoS value 2. FIG. 25 illustrates only 25 ms to illustrate details. Furthermore, a lower part of FIG. 25 illustrates a case where a plurality of time slot groups of the same period is allocated.

Example 4: Resource Management Method

In Example 4, the Controller 100 manages (stores) the following information in the schedule DB 160 for each set of set periodic time slots. In a case where a plurality of time slots of the same period is set, the information is managed for each first time slot.

That is, the Controller 100 manages, for each transmission frequency of periodic communication in which set periodic time slots can be used, a first transmission time slot, a remaining transmittable amount in which transmission is performed in time slots of the corresponding transmission frequency (minimum value of remaining transmittable amounts of the respective time slots), the maximum jitter as time difference of the time slot deviating the most from the periodic interval, and dependence relationship (entry of a transmission frequency using the same time slots) for each transmission frequency.

Figure 26:
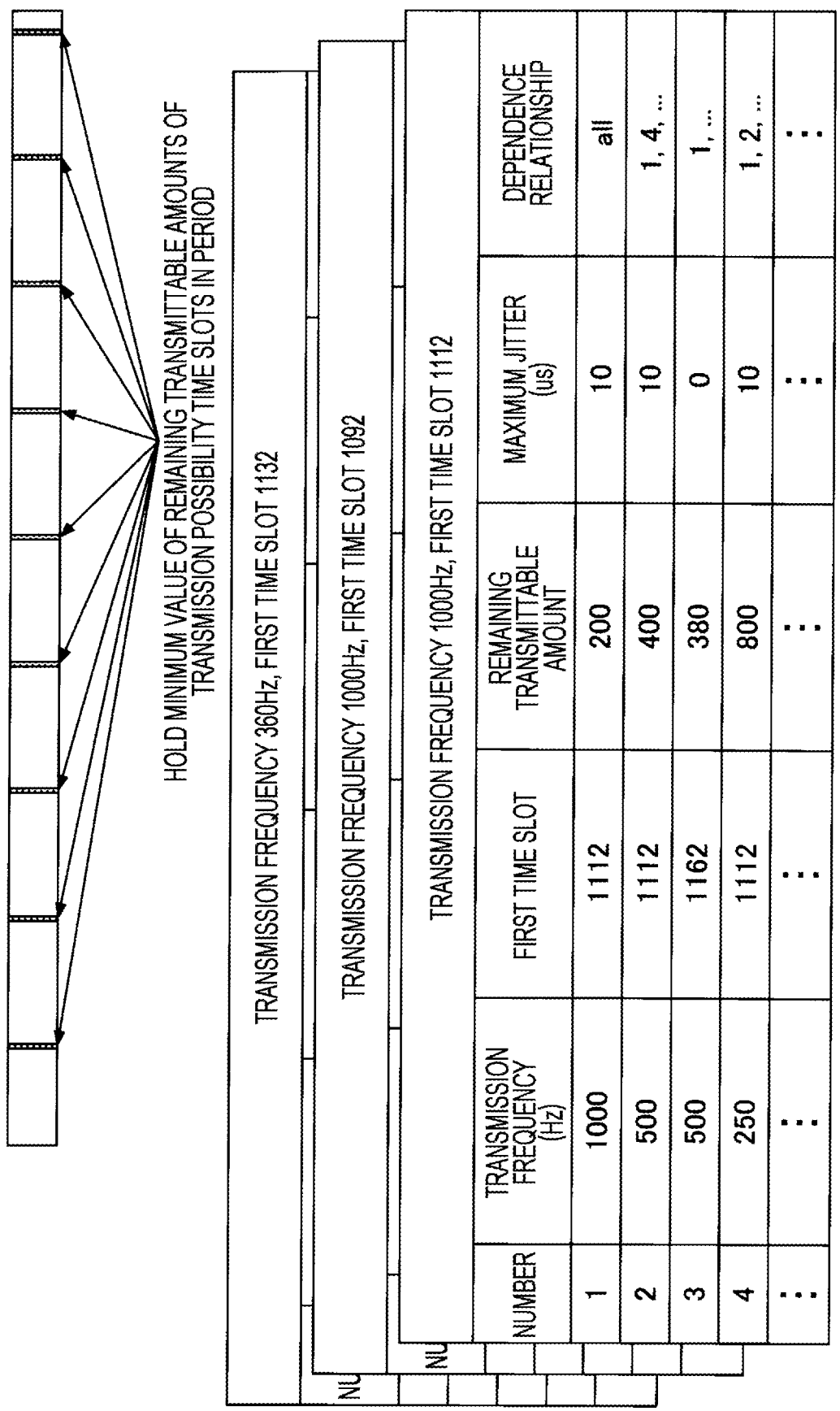
FIG. 26 is a diagram for describing Example 4.

FIG. 26 illustrates an example. In the example of FIG. 26, for example, in a group in which a transmission frequency is 1000 Hz and a first time slot is 1112, it is illustrated that, for a first time slot 1112 of a transmission frequency 1000 Hz, the remaining transmittable amount is 200, the maximum jitter is 10 µs, and it is dependent on all other communication.

Example 4: Resource Allocation Method

Next, a resource allocation method in Example 4 will be described.
<S1>
The schedule calculation unit 120 selects a possibility that satisfies a communication frequency and a request transmission amount requested from the Talker 200, notifies the Talker 200 of the possibility, and subtracts the request transmission amounts from respective time slots.
<S2>
Next, the schedule calculation unit 120 recalculates remaining transmittable amounts of other possibilities having dependence relationship with the possibility selected in S1 (sharing time slots to be used).

Example 4: Calculation Amount

The calculation amount of Example 4 is expressed as, at the time of resource allocation, the number of possibilities for the communication frequency to be searched the remaining transmittable amount reference O (1).

The recalculation of the remaining transmittable amounts is expressed as, $n * \Sigma_{k \in K} t S_k * O(1)$ for the number of hops n, the set K of all possibilities, and the number of time slots $ts_k$ of a possibility $k \in K$ in the worst case in which all the possibilities need to be updated. In the recalculation, the calculation amount may increase as compared with O (nm) in a case of performing calculation for each communication request in Example 3.

Example 5

Figure 27:
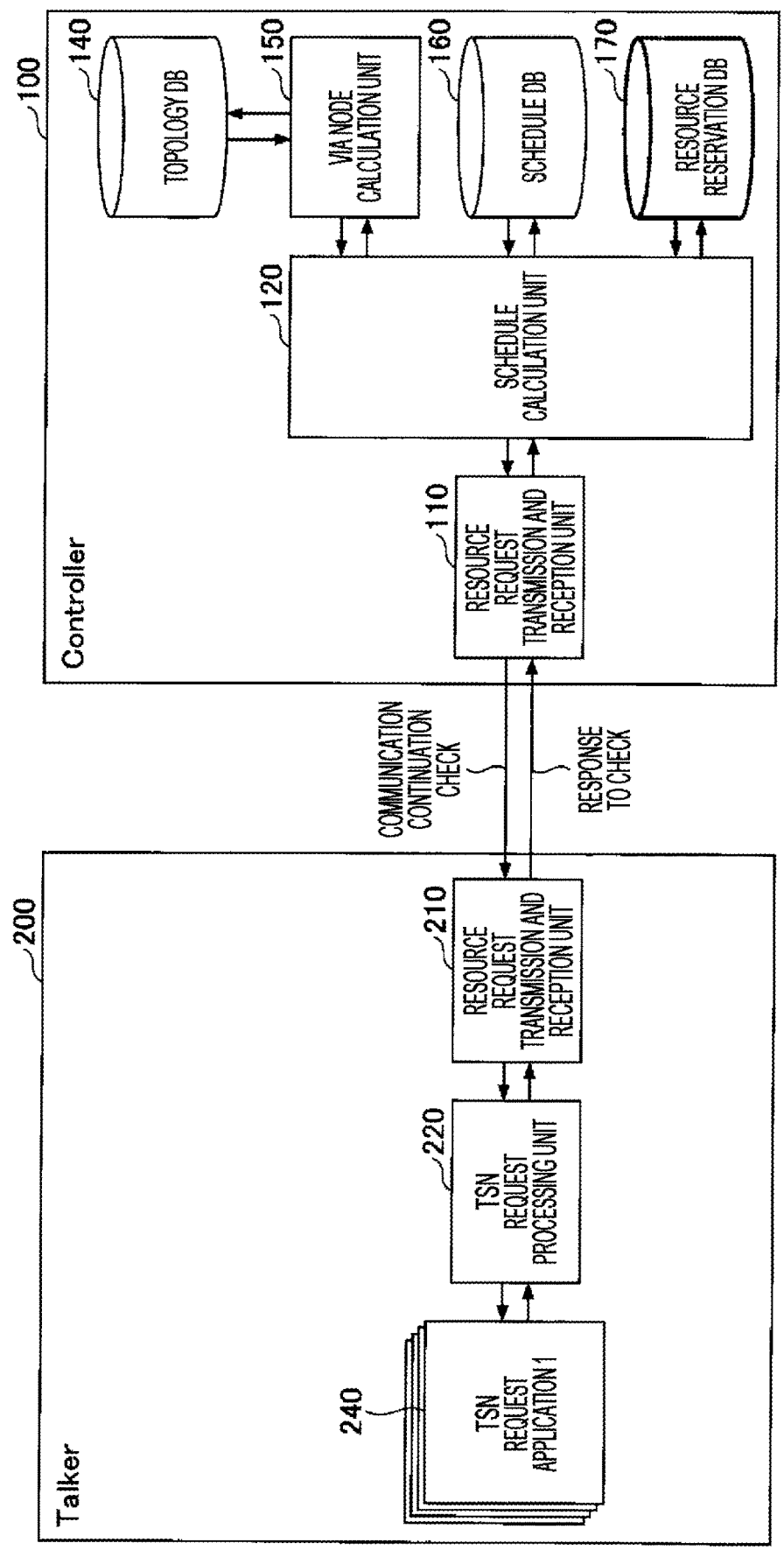
FIG. 27 is a diagram for describing Example 5.

Next, Example 5 will be described. In Example 5, method of releasing resources allocated in Examples 1 to 4 at the end of communication of a TSN application using the resources will be described. In Example 5, as illustrated in FIG. 27, a resource reservation DB 170 is provided. A procedure of Example 5 is as follows.
<S1>
When time slot allocation for TSN communication is performed on the basis of a request from the Talker 200, the schedule calculation unit 120 of the Controller 100 sets resource reservation deadlines and registers the resource reservation deadlines in the resource reservation DB 170 together with transmission and reception addresses of the TSN communication, periods, first transmission time slots, and transmission request amounts.
<S2>
The schedule calculation unit 120 checks whether the TSN communication reserved for the Talker 200 is continued for an entry having a resource reservation deadline that has passed.
<S3>
The schedule calculation unit 120 extends and re-registers the resource reservation deadline only in a case where there is a response indicating continuation within a specified timeout period, and in other cases, adds the transmission request amount to time slots of a corresponding schedule. That is, the resources of the TSN communication allocated to the Talker 200 are released.

Although any method may be used to check whether the TSN communication is continued in S2, for example, as illustrated in FIG. 27, whether the TSN communication is continued can be checked by a request for communication continuation check being transmitted from the Controller 100 to the Talker 200 and a response to the check being transmitted from the Talker 200.

Furthermore, a general garbage collection method such as transmission traffic monitoring on the Talker 200 side in which a heartbeat signal indicating communication continuation is periodically transmitted from the Talker 200 may be applied.

Example 6

Next, Example 6 will be described. In Example 6, as a changing method for allocated resources, a method of reallocating already allocated resources to another communication request will be described.

In methods of Examples 1 to 4, since resources are allocated in order of requests for TSN communication, resource allocation may not be able to be performed in a case where there is a higher priority TSN communication request later. This is an issue caused by time slots being dynamically allocated.

Figure 28:
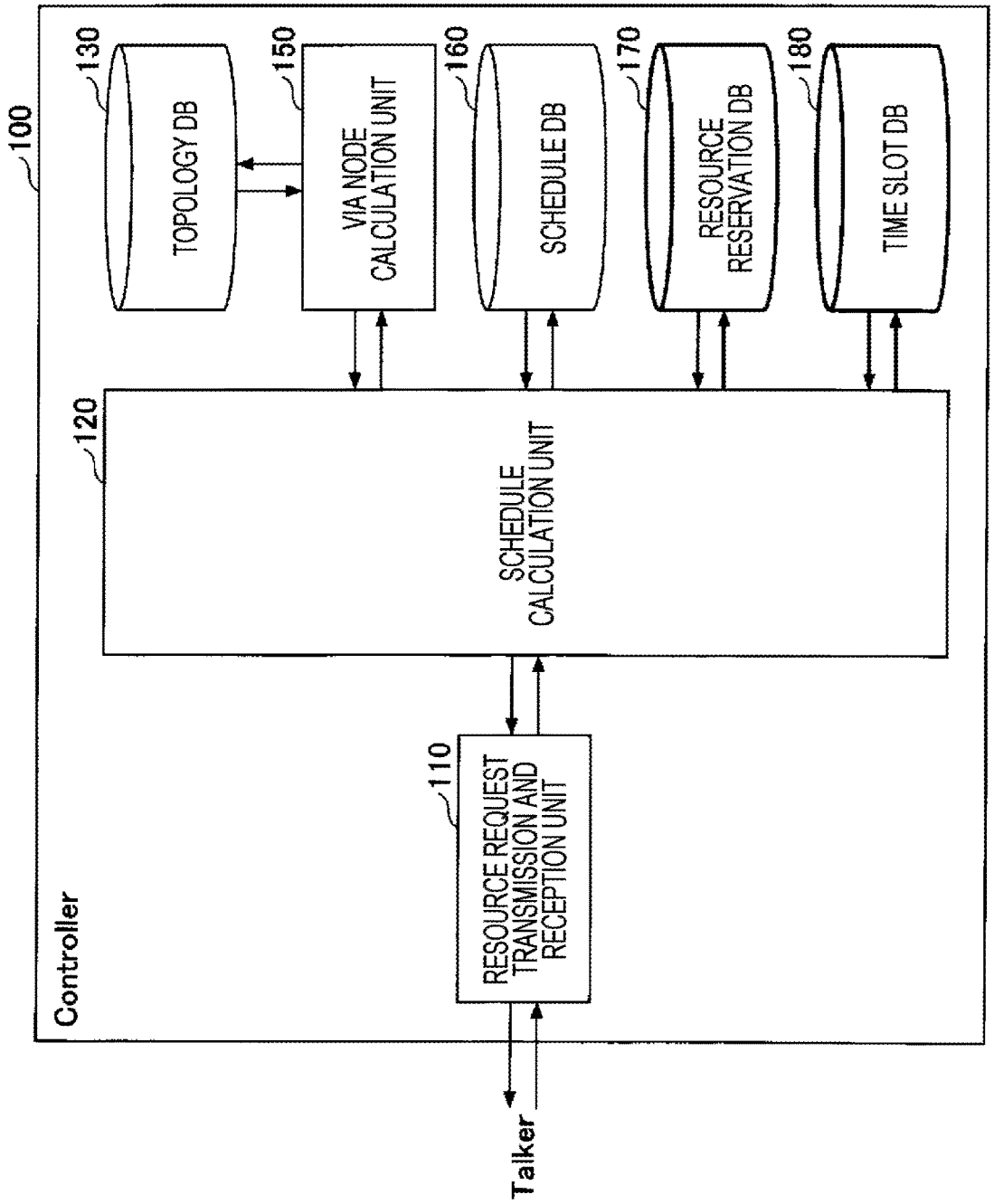
FIG. 28 is a diagram for describing Example 6

Therefore, in Example 6, as illustrated in FIG. 28, the Controller 100 includes the resource reservation DB 170 and a time slot DB 180 that manages by which resource reservation a time slot is used for each time slot, and in a case where a remaining transmittable amount of a time slot is less than a communication request amount, TSN communication using the corresponding time slot is referred to from the resource reservation DB 170 on the basis of information of the time slot DB 180, and re-resource allocation or cancellation of resource allocation of the existing resource reservation is performed.

Example 6: DB Update Method

A procedure of an update method of the resource reservation DB 170 and the time slot DB 180 is as follows.

<S1>

When resource allocation for a certain communication request is performed according to Examples 1 to 4, the schedule calculation unit 120 of the Controller 100 sets resource reservation deadlines and registers the resource reservation deadlines in the resource reservation DB 170 in the Controller 100 together with transmission and reception addresses of TSN communication, periods, first transmission time slots, transmission request amounts, and resource reservation IDs.

<S2>

When performing resource allocation, the schedule calculation unit 120 registers resource reservation IDs, transmission allocation amounts, transmission allocation amounts of all time slots allocated by resource reservation (total communication allocation amount), and priority levels in the time slot DB 180 for each time slot of devices to which a remaining transmittable amount is allocated. There are a method of using CoS values, transmission and reception addresses, and the like as priority levels, and a method of uniquely determining priority levels and performing notification between the Talker 200 and the Controller 100 at the time of a communication request. FIG. 29 illustrates an example of management data managed in the time slot DB 180.

Example 6: Resource Reservation Changing Method

Next, a procedure example of a resource reservation changing method will be described. In the following example, a new communication request is referred to as a communication request A, and a communication request to be changed for which resources have already been reserved is referred to as a communication request B.

<S1>

In a case where there is no time slot that can satisfy a transmission request amount in resource allocation for the communication request A performed with reference to the schedule DB 160 (Examples 1 to 4), the schedule calculation unit 120 refers to resource reservation information associated with a time slot that is a transmission possibility from the time slot DB 180.

<S2>

The schedule calculation unit 120 selects resource reservation such that the sum of the remaining transmittable amount of the corresponding slot and the transmission request amount of the communication request B already using the corresponding slot is equal to or larger than the transmission request amount of the communication request A. As a selection criterion of resource reservation to be changed, it is conceivable to sequentially select resource reservation having low priority level, or select resource reservation having a small total transmission allocation amount and thus a small influence on other time slots.

<S3>

The schedule calculation unit 120 refers to information of the resource reservation selected in S2 from the resource reservation DB 170, and performs provisional resource allocation of the communication request A in a state in which the communication request amount of the communication request B is added to remaining transmittable amounts of schedules for respective transmission ports to which resources are allocated.

<S4>

The schedule calculation unit 120 performs re-resource allocation of the communication request B in a state in which the transmission request amount of the communication request A is subtracted from the schedules for the respective transmission ports. In a case where the resource allocation of the communication request B is successful, a resource reservation change instruction is transmitted to a Talker 200 that is a request source of the communication request B.

<S5>

In a case where the resource reservation change instruction is approved, the schedule calculation unit 120 confirms the provisional resource allocation of the communication request A and the re-resource allocation of the communication request B, and transmits resource allocation information to a Talker 200 that is a request source of the communication request A.

Example 7

Next, Example 7 will be described. In Example 7, a schedule management method for improving band utilization efficiency while reducing a disk usage amount of the schedule DB 160 will be described.

Figure 30:
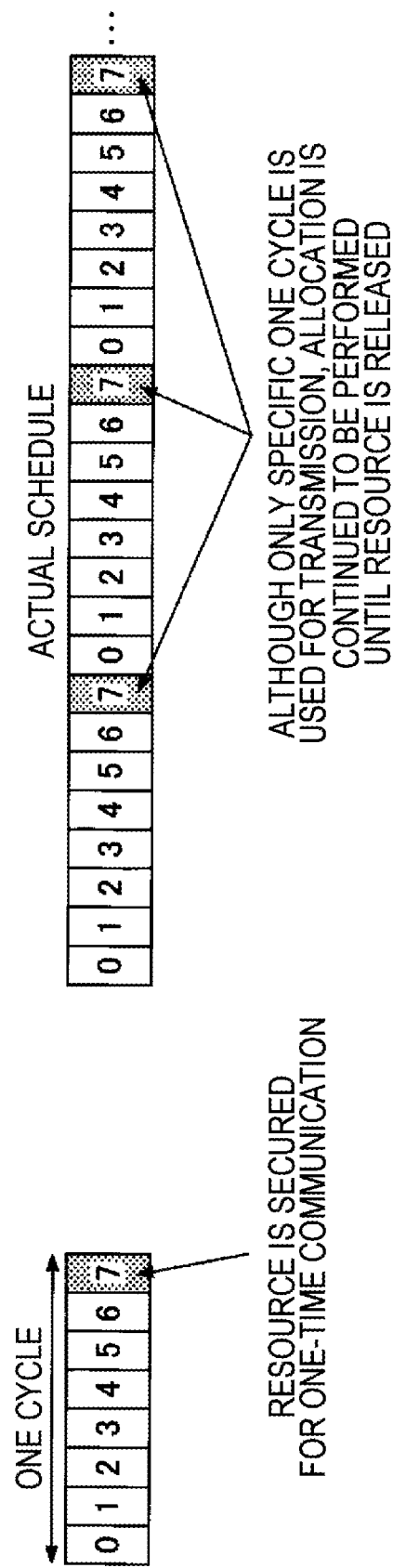
FIG. 30 is a diagram for describing Example 7.

In the present embodiment, in a case where a schedule is managed only for one cycle, a resource of a time slot allocated to one-time communication is secured for every cycle. As a result, the band utilization efficiency decreases. An example of this case is illustrated in FIG. 30. The example of FIG. 30 illustrates that a time slot 7 for one cycle is secured for one-time communication, and thus the time slot 7 is secured for every cycle.

Figure 31:
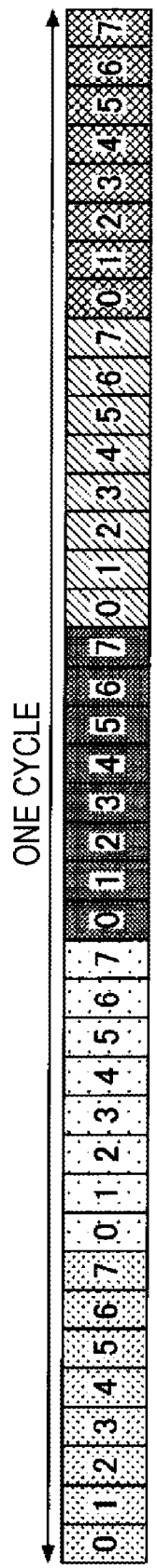
FIG. 31 is a diagram for describing Example 7.

On the other hand, in a case where a schedule for a plurality of cycles is managed, data capacity per schedule increases, and each of the cycles is regarded as an independent time slot, and thus, all time slots for the plurality of managed cycles need to be allocated in order to secure resources for periodic communication. FIG. 31 illustrates an example of a case where a schedule is managed using five cycles as one cycle. In this example, the band utilization efficiency is improved by a resource for one-time communication being secured, but the amount of data per schedule increases. Furthermore, resource allocation calculation for periodic communication also requires calculation for five cycles.

For example, in a case where the time of one time slot is held at 10 us and the maximum remaining transmittable amount and the class are held at 2 bytes, 200 kB is consumed in a cycle of one second. In a case where the number of devices included in the TSN domain is 100 and the number of transmission ports is 20, 400 MB is required for schedule management of all the devices in one cycle.

In Example 7, in the Controller 100, schedules of periodic communication and one-time communication are managed separately, n schedules for periodic communication are obtained by duplicating, and resources are allocated to one-time communication from the schedules obtained by duplicating, thereby solving the above issue.

Figure 32:
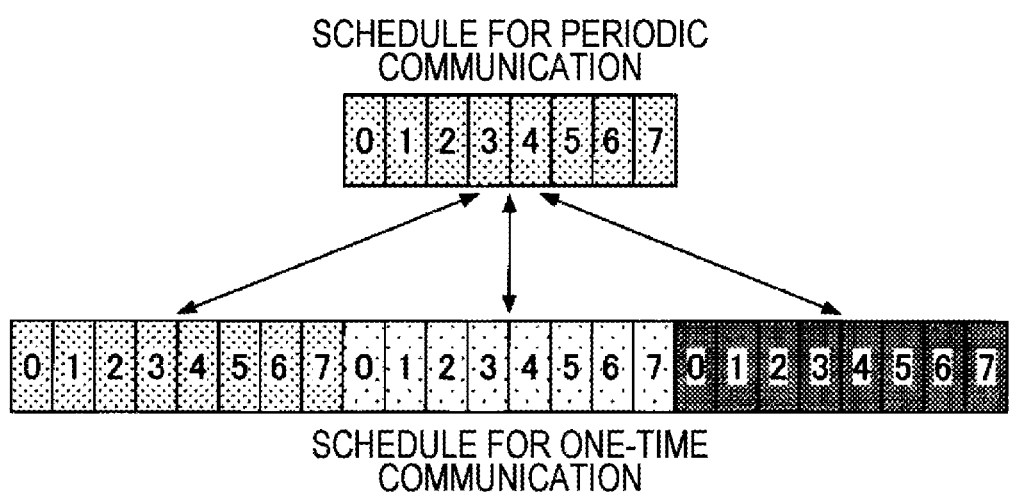
FIG. 32 is a diagram for describing Example 7.

That is, as illustrated in FIG. 32, the schedules for periodic communication and for one-time communication are managed separately, and at the time of resource allocation of either one, only a portion affecting the other is updated, so that the amount of information per schedule is reduced, and the band utilization efficiency is improved while the resource allocation for periodic communication is made efficient.

Example 7: Detailed Example of a Schedule Management Method

A detailed example of the schedule management method will be described with reference to FIG. 33.

In the schedule DB 160, remaining transmittable amounts of one-time communication and periodic communication are managed as separate schedules. Furthermore, the schedule calculation unit 120 duplicates remaining transmittable amounts of respective time slots for one cycle of the periodic communication to obtain n cycles, and stores a schedule for n+1 cycles in the schedule DB 160 for each transmission port. Note that, here, it is assumed that the period of the periodic communication is one cycle in the schedule to be managed.

Figure 33:
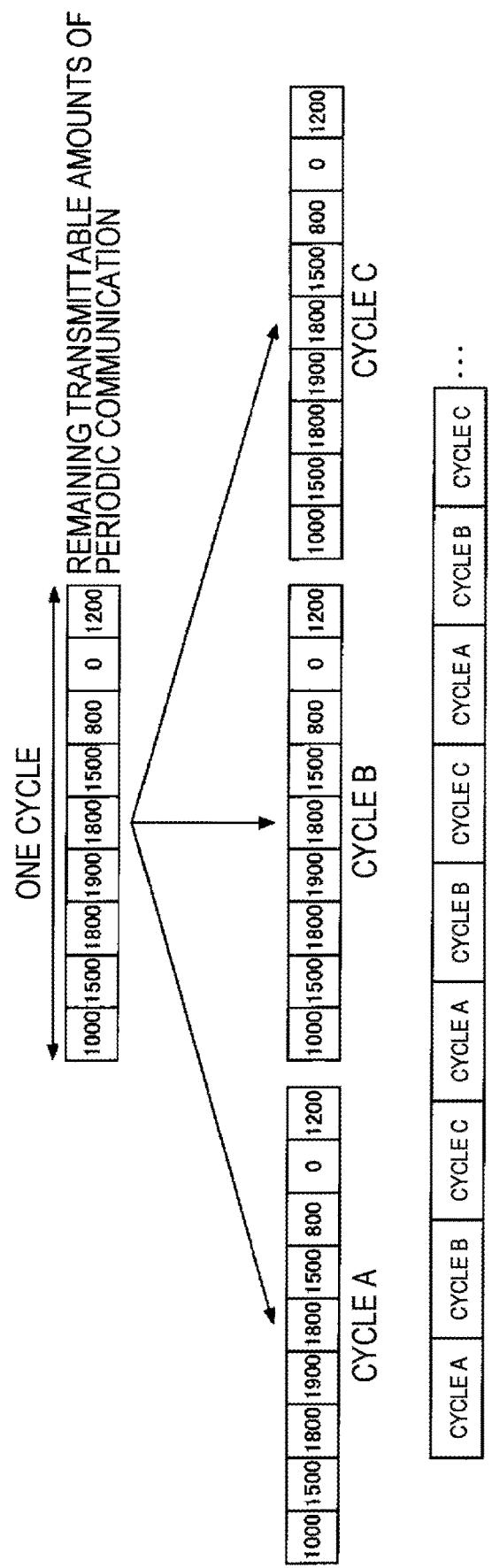
FIG. 33 is a diagram for describing Example 7.

In the example of FIG. 33, remaining transmittable amounts of respective time slots for one cycle that is a schedule of the periodic communication is duplicated so that three cycles of a cycle A, a cycle B, and a cycle C are obtained, and a schedule for four cycles in total is stored in the schedule DB 160 for each transmission port.

In the actual transmission schedule of each transmission port, n cycles obtained by duplicating are repeated. In one-time communication, the time slot occupancy time of the one-time communication can be reduced to 1/n by any one of time slots of the n cycles obtained by duplicating being allocated.

Example 7: Resource Allocation Method for One-Time Communication

A procedure of resource allocation method for one-time communication is as follows.
<S1>
The schedule calculation unit 120 performs resource allocation for one-time communication from n cycles obtained by duplicating according to Examples 1 and 2.
<S2>
After the resource allocation, the schedule calculation unit 120 updates the minimum value of time slots of the corresponding cycle and the minimum value of time slots of a cycle of a schedule for periodic communication.

Figure 34:
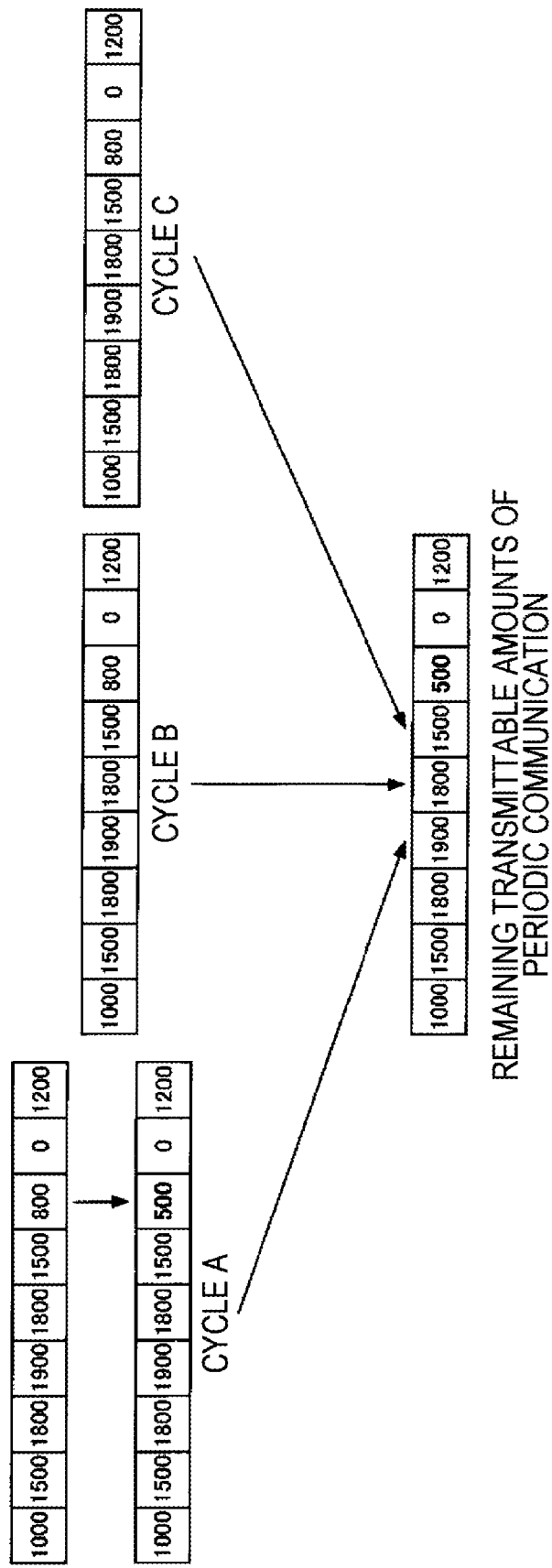
FIG. 34 is a diagram for describing Example 7.

In an example illustrated in FIG. 34, one time slot of the cycle A among three cycles obtained by duplicating is allocated, and the remaining transmittable amount for periodic communication is updated.

Example 7: Resource Allocation Method for Periodic Communication

A procedure of resource allocation method for periodic communication is as follows.
<S1>
The schedule calculation unit 120 allocates resources according to Examples 3 and 4 from remaining transmittable amounts of one cycle of periodic communication.
<S2>
The schedule calculation unit 120 subtracts the allocated resources from remaining transmittable amounts of the respective n cycles obtained by duplicating.

Figure 35:
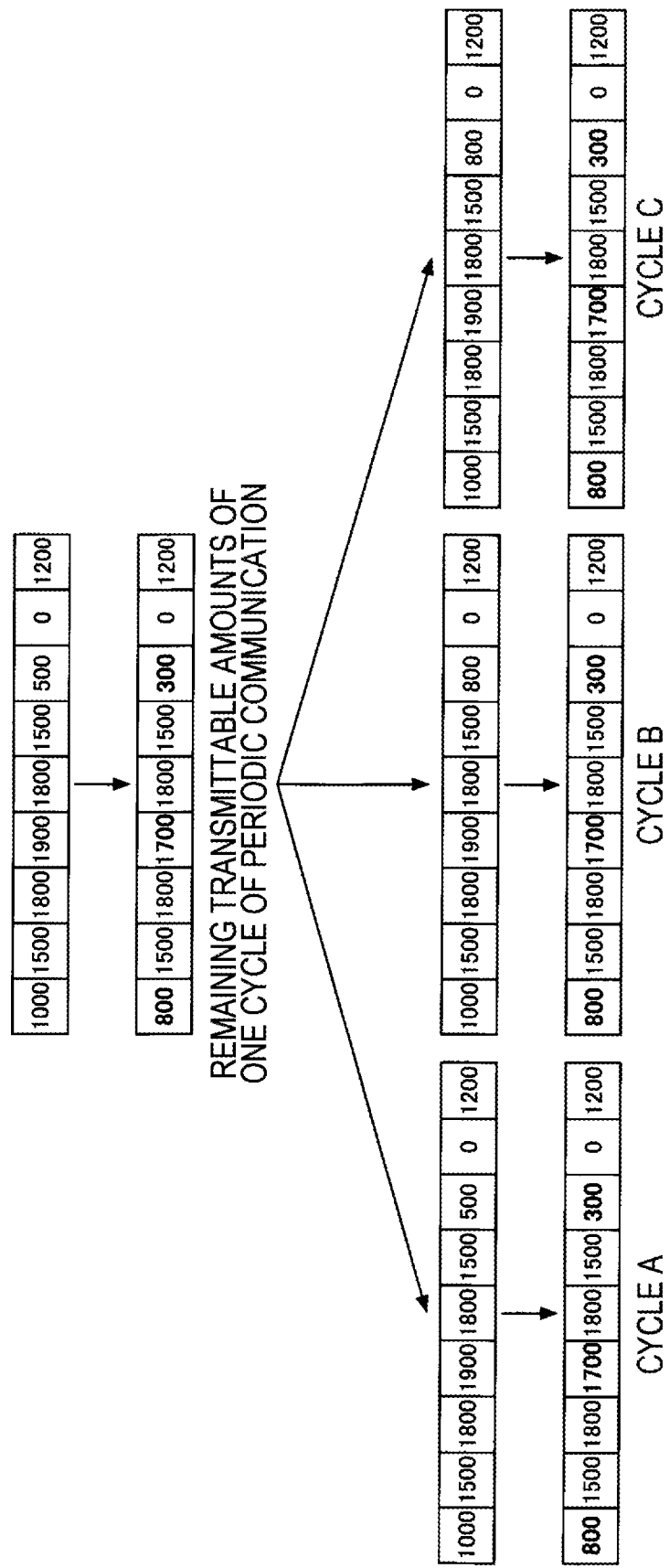
FIG. 35 is a diagram for describing Example 7.

In an example illustrated in FIG. 35, resources of three time slots are allocated from one cycle, and the allocated resources are subtracted from remaining transmittable amounts of three cycles obtained by duplicating.

Example 8

In Example 8, a system configuration using the Proxy 500 (proxy transmission device) that performs resource request processing and transmission processing after resource allocation in the Talker 200 described in Examples 1 to 7 (setting of CoS values for each TSN request communication and transmission processing in specified time slots) instead of the Talkers 200 will be described.

Figure 36:
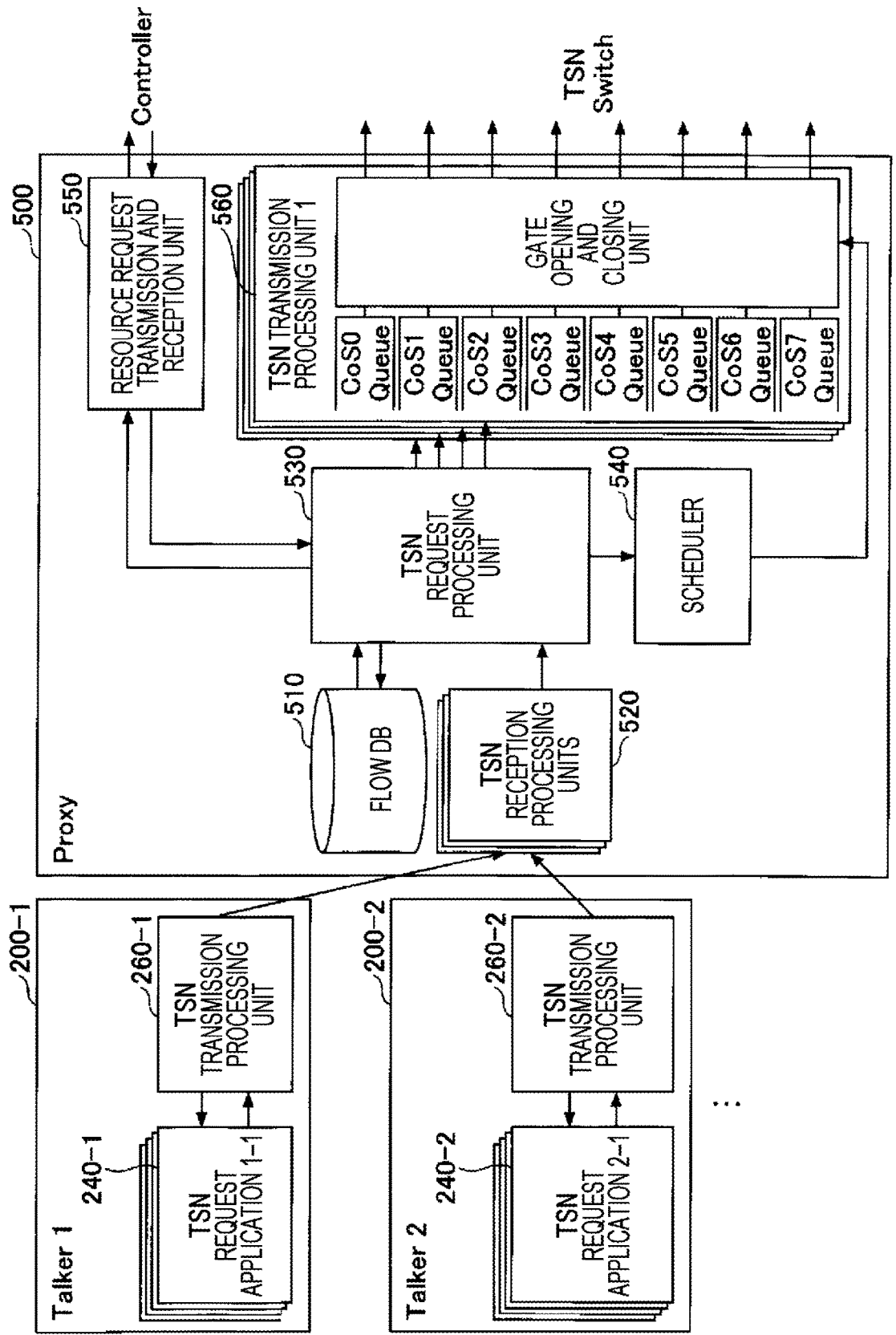
FIG. 36 is a diagram for describing Example 8.

FIG. 36 illustrates an example of a system configuration including Talkers 200 (200-1 and 200-2 in this example) and the Proxy 500.

As illustrated in FIG. 36, a Talker 200 includes the TSN request applications 240 and a TSN transmission processing unit 260.

The Proxy 500 includes a flow DB 510, TSN reception processing units 520, a TSN request processing unit 530, a scheduler 540, a resource request transmission and reception unit 550, and TSN transmission processing units 560. The functions of the TSN request processing units 530, the scheduler 540, the resource request transmission and reception unit 550, and the TSN transmission processing units 560 are similar to the functions of the TSN request processing unit 220, the scheduler 2300, the resource request transmission and reception unit 210, and the TSN transmission processing units 250 illustrated in FIG. 10.

The TSN reception processing units 520 receive TSN request communication from one or more Talkers 200. The flow DB 510 stores information indicating which resource reservation the received TSN request communication is associated with. Note that the Talkers 200 and the Proxy 500 may be implemented by a virtual machine, a container, or the like, and may be provided in the same physical host.

Example 8: Resource Request Method by Proxy

A procedure of a resource request method by a proxy in Example 8 will be described below.
<S1>
Between the Talkers 200 and the Proxy 500, identifiers such as unique CoS values are used for identifying the Talkers 200 and the TSN request applications 240. In a case where there are nine or more types of applications for one set of transmission and reception addresses, VLAN IDs or the like are further used.

<S2>

The Proxy 500 registers hash values of "transmission and reception addresses and CoS values" in the flow DB 510 for respective TSN request applications.

<S3>

The Proxy 500 performs communication requests to the Controller 100 for the respective TSN request applications, and registers transmission time slot information for the respective TSN request applications received from the Controller 100 in the flow DB 510 in association with the hash values corresponding to the respective TSN request applications. Then, the TSN request applications in the Talkers 200 are notified of transmission start time in consideration of delay caused by passing of the Proxy 500 and unique CoS values to be used. The unique CoS values to be used are CoS values for identifying the Talkers 200 and the TSN request applications 240 between the Talkers 200 and the Proxy 500.

<S4>

The Talkers 200 that have received notification perform TSN communication to the Proxy 500 on the basis of the CoS values and the transmission start time specified in the notification. That is, a packet in which a CoS value specified in the notification is set is transmitted at transmission start time specified in the notification.

<S5>

The proxy 500 refers to the flow DB 510 on the basis of a hash value of the received TSN communication (hash value of "transmission and reception addresses and a CoS value") to acquire transmission time slot information corresponding to the corresponding TSN request application (CoS value and transmission timing allocated from Controller 100), changes the CoS value of the packet to a CoS value allocated from the Controller 100, and transfers the packet to the TSN Switches 400 at specified timing (transmission time slot).

According to Example 8, the Proxy 500, as a proxy, performs resource request processing different from the standard specification of the TSN of the Talkers and selection processing of CoS values and time slots, so that the Proxy 500 and the Controller 100 are added on the existing TSN domain supporting only the standard specification of the TSN, whereby the effects according to the present embodiment can be obtained.

(Hardware Configuration Example)

Any of the devices (Talker, Controller, Listener, Proxy, TSN Switch) described in the present embodiment can be implemented, for example, by a computer performing a program in which processing contents described in the present embodiment are described. The computer may be a physical machine or a virtual machine on a cloud.

The above program can be stored and distributed by being recorded in a computer-readable recording medium (portable memory or the like). Furthermore, the above program can also be provided through a network such as the Internet or an electronic mail.

Figure 37:
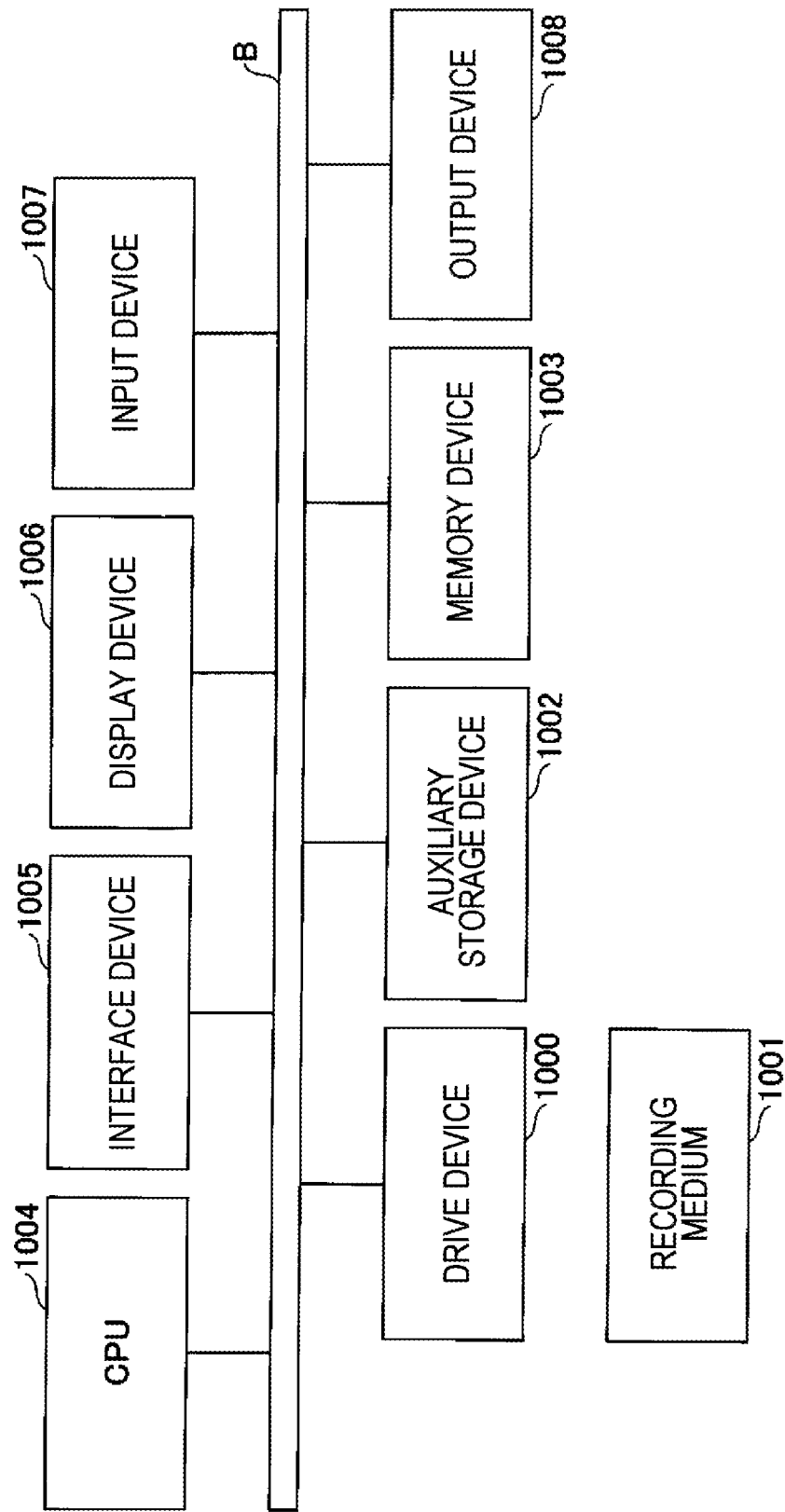
FIG. 37 is a diagram illustrating a hardware configuration example of a device.

FIG. 37 is a diagram illustrating a hardware configuration example of the computer. The computer in FIG. 37 includes a drive device 1000, an auxiliary storage device 1002, a memory device 1003, a central processing unit (CPU) 1004, an interface device 1005, a display device 1006, an input device 1007, an output device 1008, and the like which are connected to each other by a bus B.

The program for implementing the processing in the computer is provided by, for example, a recording medium 1001 such as a compact disc read only memory (CD-ROM) or a memory card. When the recording medium 1001 that stores the program is set in the drive device 1000, the program is installed from the recording medium 1001 to the auxiliary storage device 1002 via the drive device 1000. However, the program is not necessarily installed from the recording medium 1001, and may be downloaded from another computer via a network. The auxiliary storage device 1002 stores the installed program and also stores necessary files, data, and the like.

In a case where an instruction to start the program is made, the memory device 1003 reads and stores the program from the auxiliary storage device 1002. The CPU 1004 implements a function related to the device (in accordance with the program stored in the memory device 1003. The interface device 1005 is used as an interface for connecting to the network. The display device 1006 displays a graphical user interface (GUI) or the like by the program. The input device 1007 includes a keyboard and mouse, buttons, a touch panel, or the like, and is used to input various operation instructions. The output device 1008 outputs a calculation result.

Note that using a device using a CPU as a device described in the present embodiment (Talker, Controller, Listener, Proxy, TSN Switch) as illustrated in FIG. 37 is merely an example. A device described in the present embodiment can also be implemented by a program being performed on a device operating on an FPGA, an ASIC, or the like other than a CPU. Furthermore, a device described in the present embodiment can also be implemented as a proxy in a smart NIC including an FPGA, a white box switch, or the like.

Summary of Embodiment

In the present embodiment described above, in the TSN domain in which time-division transmission is scheduled in advance on the basis of predetermined rules, the Controller 100 that manages transmission amounts of all the devices in the TSN domain specifies transmission timing to be used for each TSN communication.

Specifically, transmittable amounts in which transmission processing can be completed within each time slot for respective nodes passing between the Talker 200 and the Listener 300 are compared, and a time slot in which a request transmission amount can be transmitted between the Talker 200 and the Listener 300 is allocated to TSN communication.

As described in Example 2, IEEE802.1Qch may be applied to scheduling, and resource allocation may be performed by classes associated with time slots being matched for devices in consideration of time slots transitioned by Qch.

Furthermore, as described in Example 4, a schedule in which the same class IDs are allocated to a time slot group that can be used in a plurality of types of periodic communication may be set in advance, and transmission amounts that can be used may be calculated for the respective types of periodic communication, whereby resource allocation of the periodic communication may be efficiently performed.

Furthermore, as described in Example 6, allocated resources can also be changed. That is, resource allocation information including used time slots and transmission allocation amounts for respective transmission requests and time slot information including which resource is allocated for each time slot of schedulers are managed in the Controller 100, so that resources can be reallocated in a case where resources are insufficient.

Furthermore, as described in Example 7, as a schedule management method, the method may be used in which remaining transmittable amounts of respective time slots in resource allocation of periodic communication and one-time communication are separately managed, and, at the time of resource allocation of either one, remaining transmittable amounts of the other one are reflected.

Furthermore, as described in Example 8, by the Proxy 500 that, as a proxy, performs processing of the Talkers 200 being included in the TSN domain of the standard specification, the effects according to the present embodiment can be obtained without the Talkers 200, the Listener 300, and the TSN Switches 400 being changed from the standard specification.

Effects of Embodiment

According to the present embodiment, there is provided technology that enables scheduling that is not limited to nine types in scheduling resources for a communication request, and enables efficient setting of communication resources.

More specifically, since setting change of all the devices is unnecessary every time a service requiring TSN communication is added or deleted, effects can be obtained in which time from a TSN communication request to the start is shortened, control traffic for the setting change is not generated, and communication interruption for each port due to the setting change is not generated.

Furthermore, by classes and transmission start timing being specified in TSN communication for each service, nine or more types of independent schedules that cannot be performed in the existing TSN can be performed.

Furthermore, even though each of the devices in the TSN domain supports only the standard specification of the TSN, the above effects can be obtained using the Proxy 500 that, as a proxy, performs TSN request and transmission processing.

(Supplement)

In the present specification, at least a control device, a resource allocation method, or a program described in clauses described below is described.

(Clause 1)

A control device that performs resource allocation to a network including a transmission device, one or more transfer devices, and a reception device as nodes, the control device including a schedule database unit that holds schedules of time slots not allocated to specific communication, the schedules being set in advance for respective nodes of the network, and a schedule processing unit that, in a case where a communication request is received, selects a time slot that satisfies a transmission request amount of the transmission device on the basis of remaining transmittable amounts of respective time slots in the schedules and notifies the transmission device of a selected time slot.

(Clause 2)

The control device according to clause 1, in which the schedule processing unit calculates minimum values of remaining transmittable amounts between a plurality of transmission ports through which communication passes between the transmission device and the reception device in respective time slots of the schedules, selects a time slot having a minimum value that satisfies the transmission request amount, and subtracts the transmission request amount from corresponding time slot in schedules of respective nodes.

(Clause 3)

The control device according to clause 1 or 2, in which the communication request is a request for one-time communication or a request for periodic communication, and in a case where a request for the communication request is a request for periodic communication, the schedule processing unit notifies the transmission device of a first time slot of periodic time slots that satisfy a transmission request amount.

(Clause 4)

The control device according to clause 1 or 2, in which the schedule database unit, for each set of periodic time slots, holds information of a transmission frequency of periodic communication that can use corresponding periodic time slots and a first time slot as schedules of time slots of the respective nodes.

(Clause 5)

The control device according to any one of clauses 1 to 4, in which the schedule processing unit selects a time slot for the communication request by changing a resource of a time slot reserved for another transmission device to a resource of the transmission device in a case where there is no time slot that satisfies a transmission request amount of the transmission device.

(Clause 6)

The control device according to any one of clauses 1 to 5, in which the schedule database unit holds a schedule having a plurality of cycles obtained by duplicating one cycle of a schedule for periodic communication.

(Clause 7)

A resource allocation method performed by a control device that performs resource allocation to a network including a transmission device, one or more transfer devices, and a reception device as nodes, in which the control device includes a schedule database unit that holds schedules of time slots not allocated to specific communication, the schedules being set in advance for respective nodes of the network, and the resource allocation method includes a step for, in a case where the communication request is received, selecting a time slot that satisfies a transmission request amount of the transmission device on the basis of remaining transmittable amounts of respective time slots in the schedules and notifying the transmission device of a selected time slot.

(Clause 8)

A program for causing a computer to function as each unit in the control device according to any one of clauses 1 to 6.

Although the present embodiment has been described above, the present invention is not limited to such a specific embodiment, and various modifications and changes can be made within the scope of the gist of the present invention described in the claims.

REFERENCE SIGNS LIST

100 Controller
110 Resource request reception unit
120 Schedule calculation unit
130 Topology information collection unit
140 Topology DB
150 Via node calculation unit
160 Schedule DB
170 Resource reservation DB
180 Time slot DB
200 Talker
210 Resource request transmission and reception unit
220 TSN request processing unit
230 Scheduler
240 TSN request application
250 Transmission processing unit
300 Listener
400 TSN Switch 500 Proxy
510 Flow DB
520 TSN reception processing unit
530 TSN request processing unit
540 Scheduler
550 Resource request transmission and reception unit
560 TSN transmission processing unit
1000 Drive device
1001 Recording medium
1002 Auxiliary storage device
1003 Memory device
1004 CPU
1005 Interface device
1006 Display device
1007 Input device
1008 Output device

The invention claimed is:

1. A control device that performs resource allocation to a network including a transmission device, one or more transfer devices, and a reception device as nodes, the control device comprising:
a memory; and
a processor coupled to the memory and configured to:
hold schedules of time slots not allocated to specific communication, the schedules being set in advance for respective nodes of the network; and
in a case where a communication request is received, select a time slot that satisfies a transmission request amount of the transmission device on a basis of remaining transmittable amounts of respective time slots in the schedules and notify the transmission device of a selected time slot, wherein
the processor is further configured to hold, for each set of periodic time slots, information of a transmission frequency of periodic communication that can use corresponding periodic time slots and a first time slot as the schedules of time slots for the respective nodes.

2. The control device according to claim 1,
wherein the processor is configured to calculate minimum values of remaining transmittable amounts between a plurality of transmission ports through which communication passes between the transmission device and the reception device in respective time slots of the schedules, select a time slot having a minimum value that satisfies the transmission request amount, and subtract the transmission request amount from corresponding time slot in schedules of respective nodes.

3. The control device according to claim 1,
wherein the communication request is a request for one-time communication or a request for periodic communication, and in a case where a request for the communication request is a request for periodic communication, the processor is configured to notify the transmission device of a first time slot of periodic time slots that satisfy a transmission request amount.

4. The control device according to claim 1,
wherein the processor is configured to select a time slot for the communication request by changing a resource of a time slot reserved for another transmission device to a resource of the transmission device in a case where there is no time slot that satisfies a transmission request amount of the transmission device.

5. The control device according to claim 1,
wherein the processor is configured to hold a schedule having a plurality of cycles obtained by duplicating one cycle of a schedule for periodic communication.

6. A resource allocation method performed by a control device that performs resource allocation to a network including a transmission device, one or more transfer devices, and a reception device as nodes, the resource allocation method comprising:
holding schedules of time slots not allocated to specific communication, the schedules being set in advance for respective nodes of the network; and
in a case where a communication request is received, selecting a time slot that satisfies a transmission request amount of the transmission device on a basis of remaining transmittable amounts of respective time slots in the schedules and notifying the transmission device of a selected time slot, wherein
for each set of periodic time slots, information of a transmission frequency of periodic communication that can use corresponding periodic time slots and a first time slot is held as the schedules of time slots for the respective nodes.

7. A non-transitory computer-readable recording medium storing a program for causing a computer to function as a control device that performs resource allocation to a network including a transmission device, one or more transfer devices, and a reception device as nodes, the resource allocation including
holding schedules of time slots not allocated to specific communication, the schedules being set in advance for respective nodes of the network, and
in a case where a communication request is received, selecting a time slot that satisfies a transmission request amount of the transmission device on a basis of remaining transmittable amounts of respective time slots in the schedules and notifying the transmission device of a selected time slot, wherein
for each set of periodic time slots, information of a transmission frequency of periodic communication that can use corresponding periodic time slots and a first time slot is held as the schedules of time slots for the respective nodes.

* * * * *